United States Patent [19]
Arnold

[11] Patent Number: 5,582,275
[45] Date of Patent: Dec. 10, 1996

[54] MAGNETIC LATCH MECHANISM AND METHOD PARTICULARLY FOR TRAILER BRAKES

[75] Inventor: James H. Arnold, Moberly, Mo.

[73] Assignee: Orscheln Co., Moberly, Mo.

[21] Appl. No.: 517,300

[22] Filed: Aug. 21, 1995

Related U.S. Application Data

[63] Continuation-in-part of Ser. No. 248,258, May 25, 1994, Pat. No. 5,443,132.

[51] Int. Cl.[6] .................................................. B60T 7/12
[52] U.S. Cl. .................. 188/138; 188/156; 188/161; 188/164; 303/20; 303/123; 303/124
[58] Field of Search ..................... 188/138, 156, 188/163, 161, 165, 164, 106 A, 78, 325, 166, 171, 112 R; 335/209, 219, 266, 281; 310/77; 303/20, 7, 121, 124, 123, 155

[56] References Cited

U.S. PATENT DOCUMENTS

| | | | |
|---|---|---|---|
| 5,180,038 | 1/1993 | Arnold et al. | 188/171 |
| 5,443,132 | 8/1995 | Arnold | 188/138 |

*Primary Examiner*—Douglas C. Butler
*Attorney, Agent, or Firm*—D. D. McGraw; Douglas E. Sittler

[57] ABSTRACT

A mono-stable brake system having a mono-stable magnetic array composed of one or more permanent magnets and one or more electromagnets, the stable brake system condition being the brake applied mode in which the magnetic array is magnetically latched by permanent magnet power, without any electromagnet power, to a rotatable member being braked. To release the brake, the permanent magnet field strength is neutralized or at least decreased by appropriate energization of the one or more electromagnets until the magnetic array is moved by magnetic force away from the rotatable member being braked. The brake is preferably in a vehicle braking system, and particularly a trailer braking system, in which the electromagnets are kept energized at all times when the brake is released for trailer movements. The amount of brake application in the service braking mode is controlled by decreasing the magnetic field strength of the one or more electromagnets in accordance with the braking action demand placed on the system. The disclosure covers various magnetic assemblies having different magnetic array configurations as well as mounting the magnetic assembly on a brake activation arm so that the magnetic assembly is rotated in a controlled manner to maintain an improved relationship to the surface that it engages to create brake actuating force.

31 Claims, 8 Drawing Sheets

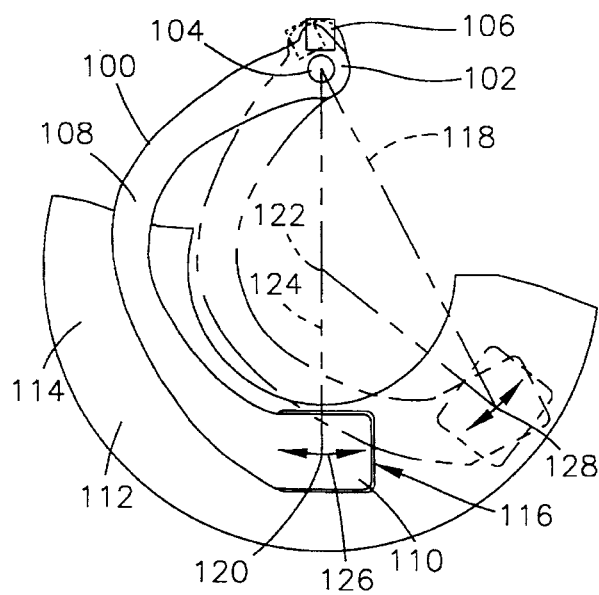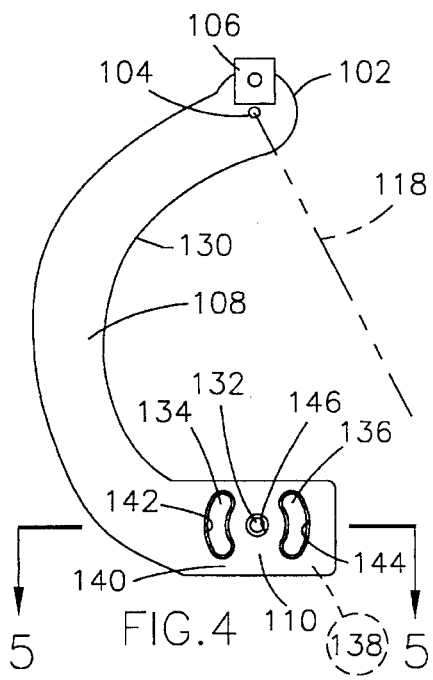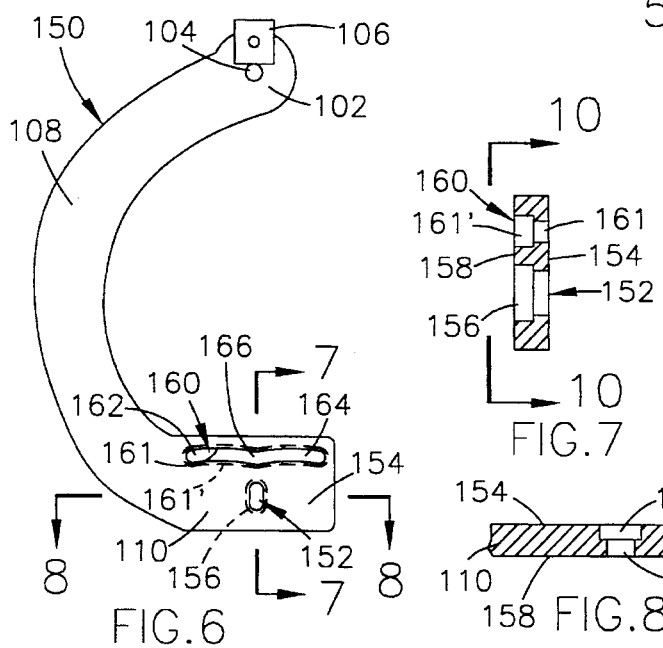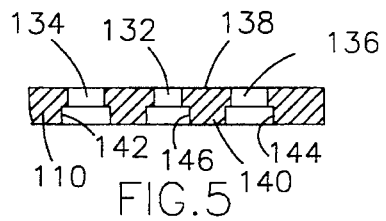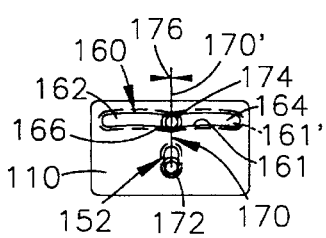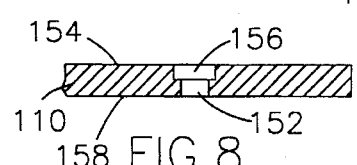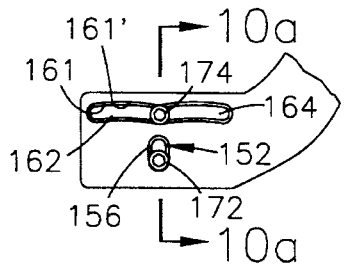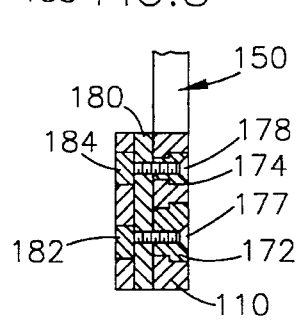

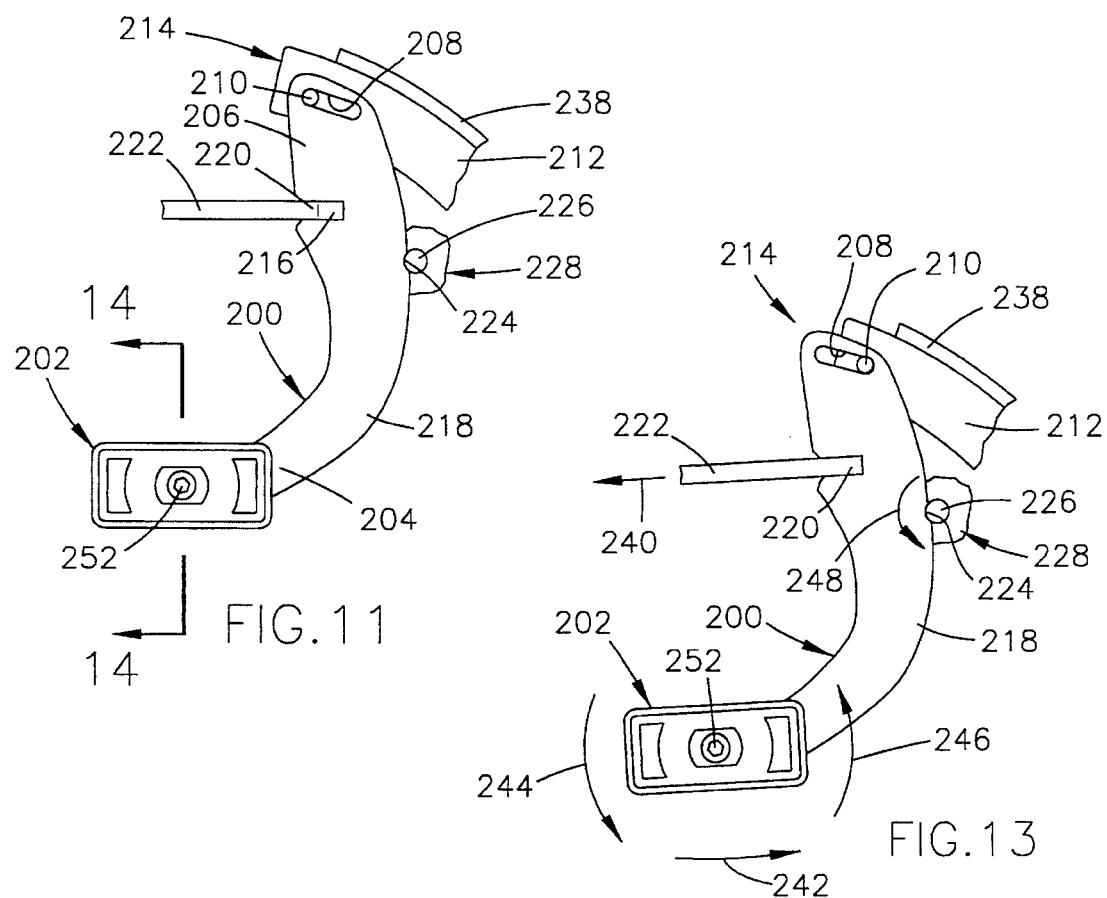
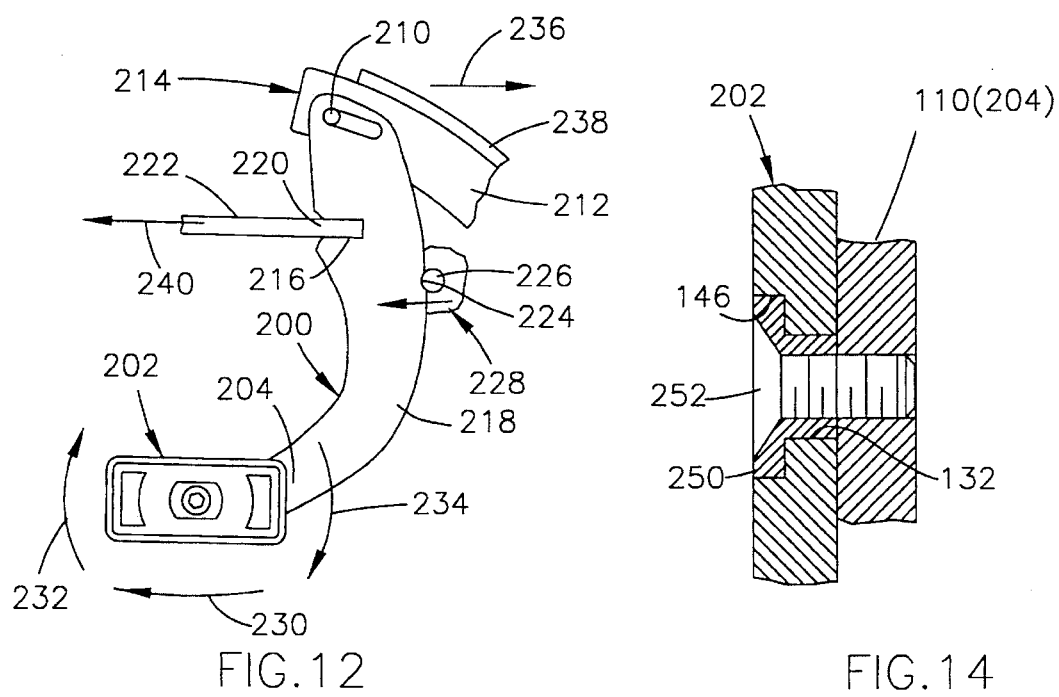

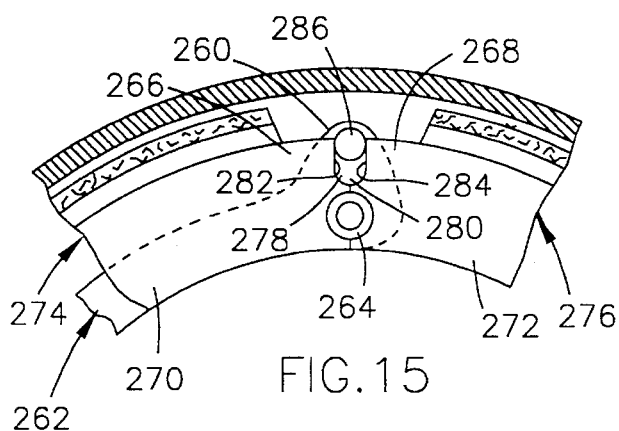
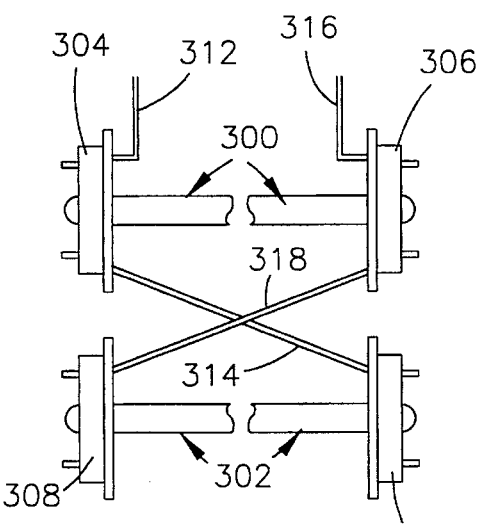
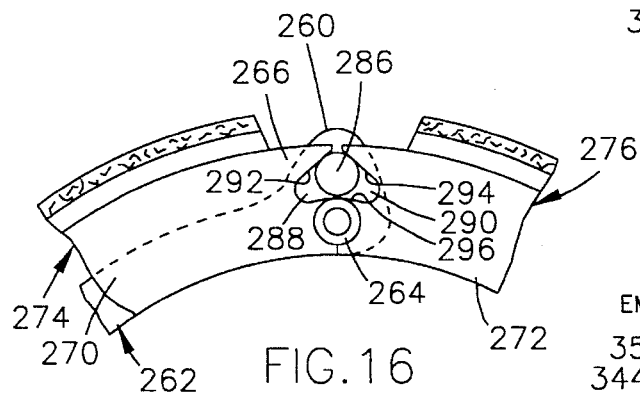
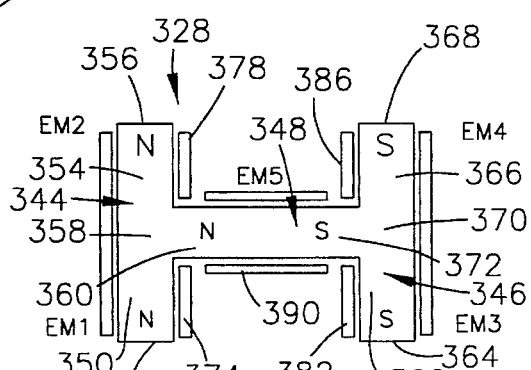
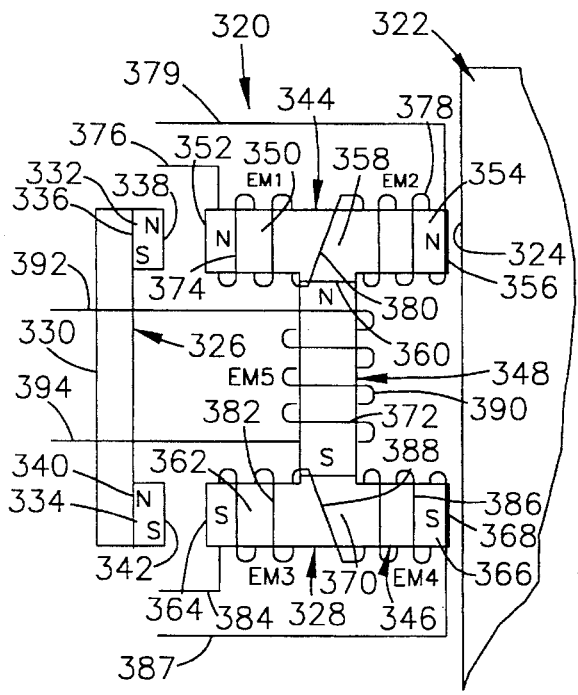
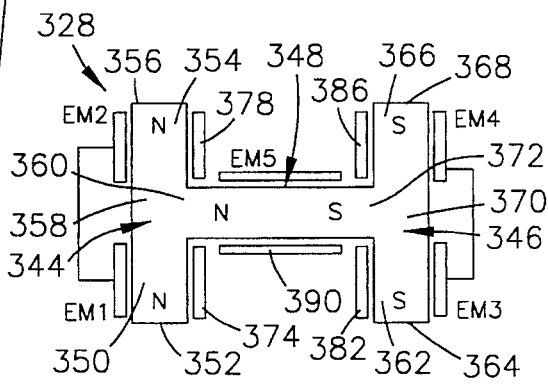

MAGNETIC LATCH MECHANISM AND METHOD PARTICULARLY FOR TRAILER BRAKES

BACKGROUND OF THE INVENTION

This is a continuation-in-part of U.S. patent application Ser. No. 08/248,258, entitled, "Magnetic Latch Mechanism And Method Particularly for Brakes," filed May 25, 1994, by the same inventor as the invention disclosed and claimed in this application, and allowed Jan. 6, 1995, then issued on Aug. 22, 1995, as U.S. Pat. No. 5,443,132. The disclosure of that application and resulting patent, when issued, is therefore incorporated in this application by reference as if fully reproduced herein. That disclosure gives a more complete background for the type of permanent magnet/electromagnet brake systems to which that disclosure is directed and to which this disclosure is also closely related.

Typical current production trailer brake systems are either operated by controlling air pressure or hydraulic pressure to brake servos, or by electrically operated brakes. Air pressure and hydraulic pressure brake systems are commonly used on commercial trailers as well as some recreational trailers. Electrically operated brakes are more commonly used on small utility and recreational trailers. Recreational trailers are sometimes referred to as travel trailers, tent trailers, mini trailers, car caddy trailers, etc. The wheel brakes used in these applications may be disc brakes or drum brakes. The disc brakes are typically of the fixed-caliper or sliding-caliper type, and the drum brakes are commonly either leading-trailing or duo-servo brakes.

A brake assembly of the electrically operated brake type typically has a magnetic drag shoe mounted on a brake shoe actuating arm and, when magnetically energized by electrical current, being magnetically engageable with a part of a rotatable drum to pivot the arm and actuate the brake shoes by moving them into engagement with the braking surfaces of the brake drum. The amount of braking effort generated is a function of the amount of electrical current used to generate the magnetic force. The greater the magnetic force, the further the brake shoe actuating arm moves arcuately (within its movement limits) before drag slippage occurs, and therefore the more brake force is applied to the brake shoes. When the electrical current is decreased the resultant braking force is lessened, and when it is no longer present there is no drag force exerted. The brake shoe retraction springs operate to retract the brake shoes from engagement with the brake drum and also to return the brake shoe actuating arm to the brake-released position.

Typical recreational vehicle trailers and similar trailer type vehicles commonly use electrically operated, electromagnetically energized and deenergized, brake systems. Systems of this general nature may be used at times on vehicles other than trailers. The parent patent application, of which this is a continuation-in-part, discloses and claims an electrically controlled magnetic parking brake system which may be so employed.

When brakes are provided on trailers pulled by a tow vehicle, they are generally required to have break-away actuating systems which will apply the trailer brakes if the trailer becomes detached from the tow vehicle while the tow vehicle and the trailer are moving. Typically, the trailer has a battery so connected that a break-away switch, closed when the trailer becomes detached from the tow vehicle, causes the battery to electrically energize the brake electromagnets and apply the brakes of the trailer. This is also commonly a full, unmodulated, brake apply. Such trailers are also required to have safety chains so connected to the tow vehicle and the trailer to prevent complete detachment of the trailer from the tow vehicle if the trailer hitch becomes uncoupled; however, these chains may not prevent the detachment of the trailer from the tow vehicle. Thus, the break-away trailer brake actuating system is a second-line of safety, stopping the trailer from continuing to roll to a coasting, undirected, stop in a shorter distance than would otherwise occur.

Typical hydraulically operated trailer systems, especially of the recreational vehicle type, use a spring loaded sliding tongue which activates a brake hydraulic master cylinder via a mechanical linkage when the tow vehicle decelerates. The trailer, trying to continue rolling, exerts a forward pressure on the tow vehicle through a compressive spring, resulting in actuation of the master cylinder. The master cylinder then generates hydraulic pressure which is proportional to the force exerted by the trailer on the tow vehicle through the sliding tongue. This hydraulic pressure is applied to the hydraulic trailer brakes. Therefore, the higher the deceleration rate of the tow vehicle, the greater the trailer braking effort. Such systems require a brake lock-out arrangement so that the trailer may be backed up by the tow vehicle without applying the trailer brakes. These trailer brakes do not usually have parking brake functions. However, if one is desired, it would normally be a mechanical stand-alone added system of the general type normally used on present-day passenger vehicles and smaller trucks.

The air pressure controlled type of brake system, in which compressed air holds off brake apply springs at a certain air pressure level, controllably decreases the air pressure and allows the loaded springs to be modulated to apply the brakes mechanically. If the air pressure is fully released, the springs hold the brakes fully applied. This functions as a parking brake system and as a break-away safety arrangement in which the brakes are fully applied when there is no air pressure holding off the brake apply spring servos.

While the larger commercial freight trailers can have anti-lock systems installed as a part of their air brake systems, the smaller trailers using the electromagnetically energized brakes or the hydraulic brakes described above do not have such systems.

In addition to the lack of parking brakes in such instances, there is no normal trailer security against being towed by unauthorized persons other that disabling the trailer hitch by placing a locked-in ball in the closed trailer hitch, with the lock mechanism being contained in a hardened steel case. This discourages unauthorized persons from breaking the hitch lock so that the hitch can be used to tow the trailer away. The brakes, whether electromagnetic or hydraulic, do not play a role in providing trailer security.

Typical patents disclosing electrically actuated brakes include U.S. Pat. No. 3,668,445-Grove, issued Jun. 6, 1972; and U.S. Pat. No. 3,760,909-Grove, issued Sep. 25, 1973. They have brake activation arms, each of which has friction material and an electromagnet on one end so that when the electromagnet is energized the friction material engages a rotatable armature face which rotates with the wheel to be braked. The resultant drag force causes the brake activation arm to pivot about its other end, and the brake shoes are spread apart by a cam or spreader bar arrangement on that arm end. Thus the brake shoes are engaged with the brake drum, and apply braking force to the rotating brake drum so long as the electromagnet is energized.

FIELD OF THE INVENTION

The invention relates to mechanisms which are magnetically latched and magnetically unlatched, and methods of using and operating such mechanisms. The invention more particularly relates to the latching and unlatching of a control member for a device, the control member being movable by controlled magnetic forces to an actuated position and to a released position. The control member when latched is magnetically latched to a second member which may be movable, either actually or incipiently, relative to the control member so that the control member is moved to its device-actuated position and, so long as the control member is magnetically latched to the second member, is urged to and does maintain the device in an actuated position. When the control member is magnetically released from the second member, it is returned by a suitable arrangement, including, at least in part, a magnetically repellant force between the control member and the second member, to a position wherein it releases the device which it controls. In some arrangements the movements for latching and release are accomplished by control of the magnetic forces in a magnetic assembly to provide the necessary attractive and repelling forces. In other arrangements the movement for either latching or release may be accomplished in part by an energy-storing device such as a spring or other force accumulator.

The invention as herein disclosed and claimed includes various features of the brake mechanism at the wheel brake as well as brake systems including control mechanisms for such brake mechanisms.

In the preferred embodiments herein disclosed and claimed, the invention is illustrated as being employed in, in combination with and including a vehicle service brake which may also function as a parking brake. The brakes illustrated are automotive vehicle service brakes and parking brakes incorporated in vehicle brake assemblies. While they may be used in a primary vehicle, they are especially useful in trailers of all types, particularly including commercial trailers, travel trailers and other light weight trailers. When used with trailers, it is also contemplated that the brake control system may be in part in the tow vehicle and in part in the towed vehicle. This application of one aspect of the invention may also be applied to a tractor-trailer rig having two or more trailers, as is now often commercially used in appropriate instances.

More particularly, the particular brake illustrated is a drum brake. While it may be of the leading-trailing type or the duo-servo type commonly used in vehicle drum brakes, it is to be understood that at least some versions of the invention may be used in other configurations of drum brakes as well as in disc brakes and combination drum/disc brakes. The invention may be used in a brake for electrical service brake operation and release as well as for electrical parking brake operation and release, or both. Brakes embodying the invention, in their service braking modes and their parking brake modes, are actuated by controlled use of electrical power. They use a combination of permanent magnets and electromagnets.

It is also to be understood that brakes embodying the invention may be brakes for machinery other than automotive vehicles. For example only and not by way of limitation, they may be brakes used in dynamometers, lathes, transmissions, or any device or mechanism which requires the application and release of a brake to a moving or movable part or parts and/or the use of a brake to hold such a part or parts against movement.

SUMMARY OF THE INVENTION

The invention in its broader aspects involves a mechanism having several features in various combinations, such features including an enhanced electric service brake with a built-in parking brake, a built-in break-away brake requiring no tether line to operate a break-away switch, capability of anti-lock service braking operation, a built-in security system which makes the vehicle on which the brake is installed very difficult to move by pushing or towing unless it is connected to another vehicle such as a towing vehicle which contains information and controls which can release the security system, built-in fault monitoring and failure detection, manually controlled lock-out or application of the brake in the event of a malfunction, and an arrangement which permits easy retrofitting an existing electric trailer brake.

The brake mechanism of the invention herein disclosed and claimed has a latching mono-stable torque-limiting drag clutch which is mounted on a brake actuating arm and is either disengaged from a rotatable brake drum or similar element, or is engaged with it. It has one or more permanent magnets and one or more electromagnets. When there in no current flow in the one or more electromagnets, the one or more permanent magnets provide sufficient magnetic attraction to keep the drag clutch in engagement with a friction surface on the brake drum or similar element (hereinafter referred to as the brake drum), or to keep it in disengaged relation with the brake drum friction surface. While this friction surface may be on various parts of the brake drum, it is preferably on the drum hub, and is therefore hereinafter referred to as the brake drum hub friction surface. Any actual or incipient rotation of the brake drum hub friction surface, with the drag clutch in magnetic force engagement with it, generates a force acting on the brake actuation arm, creating a leveraged force which expands (moves) the primary and secondary brake shoes into braking engagement with the friction braking surface of the brake drum, and braking action takes place.

When sufficient electrical current is passed through the one or more electromagnets, it cancels the magnetic attraction of the drag clutch toward the brake drum hub friction surface which was created by the magnetic force of the one or more permanent magnets. It also reverses the magnetic field on the opposite side of the drag clutch, causing that assembly to be attracted to a magnetic backing plate on a fixed part of the brake assembly. Thus the drag clutch is held away from the drum hub friction surface, and the brake assembly is released from any braking action so long as the electromagnets of the magnetic assembly are appropriately energized. To generate partial, or modulated, braking effort, the electrical current in the one or more electromagnets is decreased, allowing the magnetic field of the permanent magnets to attract and latch the drag clutch to the rotating brake drum hub friction surface with a net attractive magnetic force modulated by the amount of electrical current delivered to the electromagnets. The brake apply force is commensurate with the net effective magnetic field of the permanent magnets and electromagnets attracting the drag clutch to the brake drum hub friction surface. Also, the electrical current in the one or more electromagnets may be controlled to generate electromagnetic fields which augment the magnetic field of the permanent magnets in their latching action of the drag clutch to the rotating brake drum hub friction surface, thus increasing the effective brake actuating force.

Electronic signal-generating sensors in the brake assemblies of the trailer or vehicle may be provided to sense the actual wheel rotation in relation to free-wheeling wheel rotation, which is commonly referred to as the per cent of wheel slip. The information generated by these sensors is transmitted to the control assembly, which in turn controls the electric current to the brakes, thus controlling the amount of braking effort so that the wheels do not lock up, but are maintained at or near the optimum wheel slip for maximum braking. These signals are being continually generated while the brake assemblies are in the braking mode, thus monitoring the entire braking efforts at each of the wheels being braked.

Since the brakes are in the brake apply mode when there is no electrical current being passed through the one or more electromagnets of each brake assembly, the vehicle brakes will remain in a parking mode without the expenditure of any electrical power. It is a feature of the invention to provide a unique identification number in the trailer-mounted control which much match the identification number in the tow vehicle-mounted control in order for the trailer electronics to permit the needed electrical power to be passed through the one or more electromagnets to release the brakes. This provides a built-in anti-theft protection by effectively preventing the trailer from being hooked up to a tow vehicle which would be used to move the trailer without authorization. Any malfunction of the torque-limiting drag clutch in relation to the amount of braking that should be generated with any specific value of electrical current being passed through the one or more electromagnets is sensed by the electronic control and alerts the tow vehicle operator of such malfunction.

It is a feature of the invention that the clutch friction surface mounted on the end of the brake actuating arm is not solidly fixed to that arm end, but is pivotally mounted on it so that it maintains the clutch friction surface in the substantially the same arcuate directional relationship with the brake drum hub friction surface as the brake actuating arm is pivoted during brake actuation. This swivel action is a controlled action.

The self-energized, or duo servo, brake assemblies are preferred in the brake assemblies embodying the invention. Therefore, the electromagnetic/permanent magnet assembly (EMA) associated with the brake drag clutch operates on two different arcs. The first arc is defined by the operating arc of the brake actuating arm. The second arc is defined as the operating radius of the electromagnetic/permanent magnet assembly associated with the brake drag clutch on the brake drum hub friction surface. The radius of the first arc is therefore the radius along which the operating length of the brake actuating arm is located. The radius of the second arc is the operating radius of the electromagnetic/permanent magnet assembly associated with the brake drag clutch, which is the radius from the center of the friction surface of the brake drum hub extending to the center of rotation of the brake drum hub. Therefore, the first arc radius is considerably longer than the second arc radius.

In the brake of the parent patent application identified above, the electromagnetic assembly is a bi-stable assembly. Thus it remains in either of two positions in which it is placed when the electromagnets are not electrically energized. Also, it is allowed only to float toward and away from the brake drum hub friction surface, and not to pivot or rotate on the brake actuating arm free end. In dynamic brake application, this is not a problem since the electromagnetic assembly friction surface is designed to slide on the brake drum hub. However, in static brake operation conditions, where the electromagnetic assembly friction surface is not intended to slide on the brake drum hub, there is a problem. It takes less force to rotate the clutch face on a friction surface than it does to slide it on such a surface. This is due to the operating forces and characteristics of torque versus straight-line linear forces operating on a friction surface.

Once a fixed drag clutch friction surface begins to move in the first arc, and being fixed is prevented from moving in the second arc, the coefficient of friction changes from static to dynamic, reducing the effectiveness of the drag clutch and therefore the effectiveness of the brake assembly. When the brake drag clutch friction surface is permitted or guided to move also in the second arc, the effectiveness of the static brake of this type is increased. It is therefore advantageous to allow the electromagnet/permanent magnet assembly, of which the drag clutch friction surface is a part, to rotate while still transferring brake actuating force to the brake actuating arm. One embodiment herein disclosed and claimed uses curved guide slots formed in the brake actuating arm free end and extending generally vertically on the brake actuating arm, with the center of rotation of the drag clutch friction surface being on a radius of pivotal movement of the brake actuating arm. The curved guide slots are located on either side of that center of rotation-to-pivot point of the brake drag clutch in relation to the just-mentioned radius of pivotal movement of the brake actuating arm. A stepped pin/sleeve has the pin portion located at the pivot center of the drag clutch friction face, and guide pins attached to the back side of the magnetic assembly extend into the curved slots, permitting controlled pivotal rotation of the drag clutch friction face as the brake actuating arm is moved in an arcuate brake-force-increasing direction.

In another embodiment herein disclosed and claimed, there is one guide slot, that guide slot being generally M-shaped (albeit a rather flat M) and extending generally perpendicular to the radius of pivotal movement of the brake actuating arm. The M-shaped guide slot is therefore located across that radius, and is nearer the pivot-end of the brake actuating arm than is the center of rotation-to-pivot point of the brake drag clutch. A stepped pin/sleeve has the pin portion located at the pivot center of the drag clutch friction face, and a single guide pin is attached to the back side of the magnetic assembly and extends into the S-shaped slot, permitting controlled pivotal rotation of the drag clutch friction face as the brake actuating arm is moved in an arcuate brake-force-increasing direction. The stepped pin/sleeve pin portion is received in a relatively short slot extending along the radius to the pivoting end of the brake actuating arm.

The first of these two embodiments will provide an operating length of the brake actuating arm which is the distance between the pivot point on the pivot-end of the brake actuating arm and the center of the rotation-to-pivot point of the brake drag clutch. However, the curved slots extend to points further away from the pivot-end of the brake actuating arm than the center of the rotation-to-pivot point of the brake drag clutch extends.

A still greater operating length of the brake actuating arm is obtained by the second of these two embodiments since the rotation-to-pivot point of the brake drag clutch is placed nearer the outer extremity of the brake actuating arm free end, not being limited by the further extension of the two curved slots used in the first embodiment. Also, the second of these two embodiments permits more travel than the first embodiment, while both embodiments permit more travel of the brake drag clutch friction face than a mechanism which is rigidly attached to the brake actuating arm.

In either embodiment, the rotating member needs to be returned to a neutral position upon brake release to ensure that there is sufficient travel for the next brake actuating operation. This may be accomplished by the mechanical forces acting on the EMA, or the use of springs attached to the EMA, or a mechanical linkage in association with the M-shaped slot embodiment. While not specifically illustrated, a similar mechanical linkage may be used in association with the oppositely disposed arcuate slot embodiment.

In a modification of the brake actuating arm mounting and pivoting arrangement, the pivot end of that arm has a slot through which a pin fixed on the web of the primary brake shoe on which the arm is pivotally mounted. This slot extends generally transversely of the brake actuating arm, at an angle such that pivotal movement of the brake actuating arm pivot end in one brake-applying direction will cause the pin and therefore the brake shoe end to be forced outwardly into braking engagement with the friction braking surface of the brake drum. A spreader bar extends from the brake actuating arm near the slot of the arm pivot end to the web of the secondary brake shoe of the brake assembly.

Furthermore, the brake backing plate has a pin located on a circle having a radius substantially shorter than the radius on which the shoe web pin is located, and the brake actuating arm has a cam-like indentation which engages this pin while the brake assembly is released. Thus, the brake actuating arm moves away from this pin when the brake drum is rotating in one arcuate direction, but engages and tends to pivot around this pen when the brake drum is rotating in the other arcuate direction. When this latter action takes place, the brake arm pivots around the backing plate pin, forcing the primary brake shoe to be moved outwardly by action of the brake actuating arm slot on the shoe web pin to engage the brake drum in friction braking relation, and also acting through the spreader bar to force the secondary shoe to move outwardly to engage the brake drum in friction braking relation.

In accordance with the invention, a shielded magnetic pole magnetic array may be used. This is magnetically very efficient, but requires a careful magnetic balance to perform in a fully advantageous manner.

Another feature of the invention is the provision of a single permanent magnet backing plate for the magnetic array as opposed to a backing plate with separate, spaced apart, permanent magnets. This provides an equal magnet match of pole strengths and reduces the cost by using only a single magnet. The magnetic backing plate may have a magnetic matrix of two sets of poles while using only one permanent magnet. The magnetic legs of the backing plate magnet arrangement has magnetic legs of equal length and size so as to keep the magnetic field intensity of the pole faces equal. This also allows a better match of the magnetic field between the mono-stable latching torque-limited drag clutch magnetic backing plate operating face and the magnetic-sensitive brake drum hub friction face.

Other magnet arrangements provide various flux densities and magnetic leakage coefficients.

The trailer brakes of this disclosure require a magnetic manipulator while the magnetic array of the disclosures of the parent patent noted above requires a flux pump. The parking brakes of the parent patent require electrical power to be actuated, while the trailer brakes of this disclosure require electrical power to keep the brakes released.

Since the apply and release brake modes and the amount of braking effort obtained during brake apply are controlled by the electronic controllers, brakes embodying the invention are readily adapted to anti-lock brake use, cycling the amount of braking effort of each wheel brake in accordance with wheel-generated signals such as the per cent of wheel slip occurring during braking so as to keep the vehicle wheels rotating rather than being locked up by the overapplication of the wheel brakes for the conditions being encountered by the vehicle wheels as the brakes are in the brake apply mode.

The brakes embodying the invention can also be used on a powered vehicle such as an automobile or truck under similar circumstances to provide the effect of a locking differential when one driven wheel spins while the other is then incapable of having power delivered to it to move the vehicle. By applying the brake of the spinning driven wheel, the vehicle differential is then able to slow it down, directing drive power to the non-spinning wheel. This is the net effect of a locking differential, that is, to obtain drive power to a wheel which can be driven to move the vehicle when the other wheel on the same drive axle assembly begins to spin so that all of the rotational effort is passing through the differential to the spinning wheel and none is passing through the differential to the non-spinning wheel. This is a type of traction control which is very effective when the drive wheels are driven through a differential gear arrangement.

The magnetic assembly may use a multiple number of permanent magnets as well as a multiple number of electromagnets having magnetic poles created in the armatures thereof when energized. The magnetic assembly of the parent patent was used in a vehicle parking brake mechanism. It that application it was preferred that it use four to six electromagnets having such armatures because of power requirements and space limitations. However, in the practice of the invention of that patent or the invention herein disclosed and claimed, the magnetic assembly is not restricted to that number of electromagnets or a specific number of permanent magnets. It may use fewer or more, depending upon the usage, location, space availability and configuration, type of magnetic materials employed, and magnetic power needed for the particular application.

BRIEF DESCRIPTION OF THE DRAWINGS

FIG. 3 is a somewhat schematic representation of the brake actuation arm and EMA of the invention showing them in their brake released positions and in their brake applied positions after the EMA has magnetically latched onto the rotating brake drum hub. In this representation the arm is illustrated as if it were mounted adjacent to the other brake shoe web of the wheel brake assembly of FIG. 2 than is the brake activation arm of that FIGURE.

FIG. 4 is a somewhat schematic representation of the brake actuation arm of the invention wherein the free end of that arm has the vertically extending arcuate slots and center hole mounting for the EMA so as to guide the EMA in its rotational movements from brake release through brake apply and its return to brake release, such movements being shown schematically in FIG. 3.

FIG. 5 is a fragmentary cross section view of a portion of the free end of the brake activation arm of FIG. 4, taken in the direction of arrows 5—5 of that FIGURE.

FIG. 6 is a somewhat schematic representation of the brake actuation arm of the invention wherein the free end of that arm has the horizontally extending, curved but rather flat, M-shaped slot in the upper portion of the arm free end and the vertically elongated hole mounting for the EMA so as to guide the EMA in its rotational movements from brake release through brake apply and its return to brake release, such movements being shown schematically in FIG. 3.

FIG. 7 is a cross section view of the free end of the brake activation arm of FIG. 6, taken in the direction of arrows 7—7 of that FIGURE.

FIG. 8 is a fragmentary cross section view of the free end of the brake activation arm of FIG. 6, taken in the direction of arrows 8—8 of that FIGURE.

FIGS. 9 and 9a are schematic representations of the mounting arrangement on the free end of the brake activation arm of FIG. 6, with the EMA shown first, in FIG. 9, in its brake released position on the arm and then, in FIG. 9a, in its rotated, brake applied, position.

FIG. 10 is a fragmentary elevation view of the arm of FIG. 6, taken in the direction of arrows 10—10 of FIG. 7, with the EMA being installed on that arm free end.

FIG. 10a is a fragmentary cross section view of the free end of the brake activation arm of FIG. 6, taken in the direction of arrows 10a—10a of FIG. 10 and showing the rotational guidance arrangement of the EMA on the arm free end.

FIG. 11 is a schematic representation of a brake activation arm and EMA similar to those of FIGS. 3, 4 and 6, with a portion of a brake shoe assembly having parts being broken away. The brake actuation arm and EMA are shown in the brake released position.

FIG. 12 is similar to FIG. 11, with arrows indicating movements of the various parts during brake actuation by the arm and EMA.

FIG. 13 is similar to FIG. 11, with arrows indicating the movements of the various parts during brake releasing movement.

FIG. 14 is a fragmentary cross section view of the pivotal axis mounting of the EMA on the free end of the brake actuation arm, the view being taken in the direction of arrows 14—14 of FIG. 11.

FIG. 15 is a fragmentary elevation view of the anchor pin and related parts showing a U-shaped recess defined by edges of the brake shoe webs and forming cam surfaces engaged by a cam follower rotatably mounted on the brake activation arm pivot end.

FIG. 16 is a fragmentary elevation view similar to that of FIG. 15, with the brake shoe web cam surfaces defining a generally triangular recess in which the cam follower is received.

FIG. 17 is a schematic representation of adjacent axles of a trailer having a brake system embodying the invention in which the brake actuating and release circuits are diagonally split.

FIG. 18 is a schematic representation of one arrangement of a magnetic array's permanent magnets and electromagnets including the backup plate and the brake drum hub.

FIG. 19 is a diagrammatic representation of the magnetic array shown in FIG. 18 without any magnetic force values shown.

FIGS. 20 is a diagrammatic representation similar to FIG. 19, with the pole piece part electromagnets of the magnetic array being separate windings which can be separately energized and deenergized with various electrical power values.

DETAILED DESCRIPTION OF THE VARIOUS EMBODIMENTS

Figure 1:
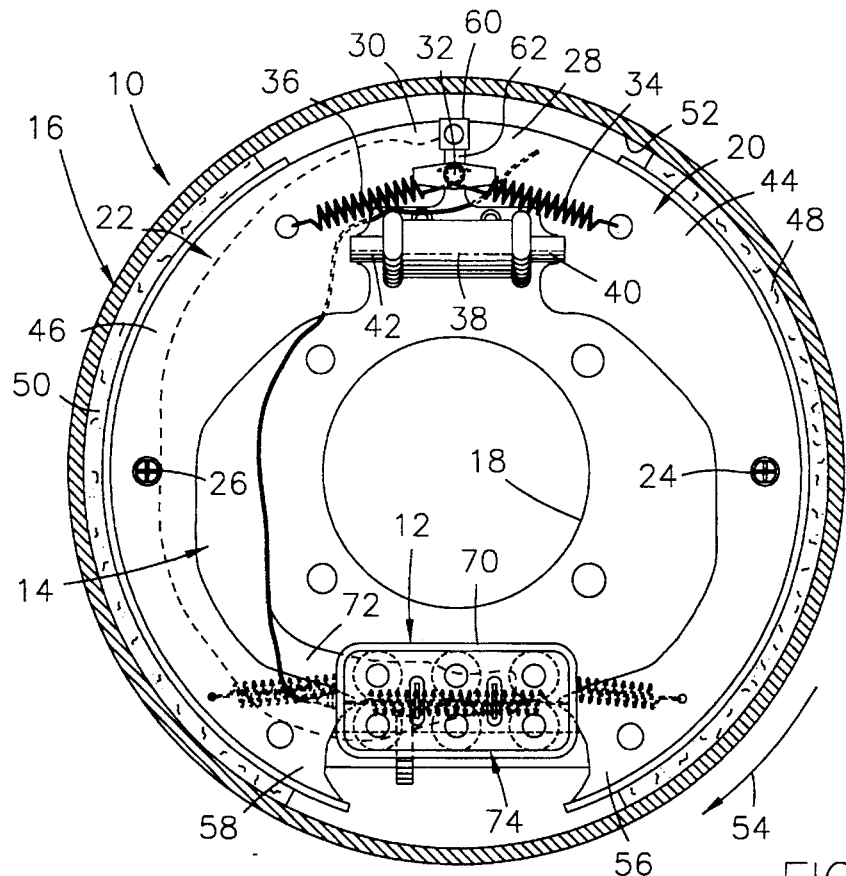
FIG. 1 is a side elevation view of a typical duo-servo drum brake assembly with a magnetic assembly embodying the invention of the parent application (now U.S. Pat. No. 5,443,132) provided in place of the conventional parking brake cable connection to one end of the parking brake activation arm.

The wheel brake assembly 10 of FIG. 1 is a typical duo-servo drum brake, except for the magnetic assembly 12 and a modified parking brake activation arm 14. It is the subject of the above-noted parent patent of which this application is a continuation-in-part. However, because of its relevance to the invention herein disclosed and claimed, it is again described here in detail.

A rotatable brake drum 16 is secured to a vehicle wheel (not shown) for rotation with the wheel. A brake assembly backing plate 18 is secured to the axle housing (not shown) so as to be relatively fixed against movements in relation to the vehicle. A primary brake shoe 20 and a secondary brake shoe 22 are mounted on the backing plate 18 by means of hold-down spring assemblies 24 and 26. The upper adjacent ends 28 and 30 of the brake shoes 20 and 22 are in engagement with the anchor pin 32, which is mounted on the backing plate 18. Brake shoe return springs 34 and 36 are respectively attached to the brake shoes 20 and 22 at one spring end and are attached to the anchor pin 32 at the other spring end. They are in tension, and therefore continually urge the brake shoe ends 28 and 30 toward engagement with the anchor pin 32. A wheel cylinder 38 is mounted on the backing plate 18 and has its oppositely-extending pins 40 and 42 respectively engaging the webs 44 and 46 of the respective brake shoes 20 and 22, near but spaced from the brake shoe ends 28 and 30.

As is well known in the art, when fluid pressure is introduced into the wheel cylinder 38 the pistons (not shown) in that cylinder move the pins 40 and 42 axially outward in opposite directions, effectively axially expanding the wheel cylinder 38 and moving the brake shoe ends 28 and 30 arcuately away from the anchor pin 32 until the brake shoe linings 48 and 50 engage the inner surface 52 of the brake drum 16. The primary shoe 20 then tends to move arcuately in the direction of rotation of the brake drum, indicated by arrow 54, with its other end 56 pushing through the brake adjuster screw 57 (not shown in FIG. 1, being hidden behind the magnetic assembly 12, but shown in FIG. 2) to the other end 58 of the secondary shoe 22, causing the secondary shoe to move arcuately against pin 42 and again engaging the shoe end 30 with the anchor pin. The mechanical multiplication of braking force by this action of the primary shoe on the secondary shoe is the second servo action of a duo-servo brake, the hydraulic action of the wheel cylinder being the first servo action.

If the brake is of the leading-trailing type, the ends 56 and 58 of the shoes engage an anchor fixed to the backing plate, and only servo action of the wheel cylinder on the shoes is obtained.

Parking brakes are usually provided on the rear wheels of an automotive vehicle, commonly as a part of the service brake at each wheel. They may also be provided as a part of the service brakes for all the wheels of a trailer, including those with multiple axles having wheels on the outer ends of each axle. When the brakes for these wheels are drum brakes, the service brake shoes are separately actuated for parking purposes. Of course, in the invention herein disclosed and claimed, the service brake mode of operation and the parking brake mode of operation use the same brake actuation and release mechanisms.

A parking brake activation arm is typically provided, and, as is described later below, is also the service brake activation arm. It is either pivoted on the anchor pin or the end of a spreader strut extending between the shoe webs near the shoe ends 28 and 30. If the spreader strut is used, it is typically located under the wheel cylinder as seen in FIG. 1, has forked ends receiving parts of the shoe webs 44 and 46 at notches in the shoe webs, with the parking brake activation arm also received in the forked end engaging the shoe web 46 of the secondary shoe 22. Alternatively, and in the instance illustrated in FIG. 1, a cam 60 may be provided on the end 62 of the parking brake activation arm 14 near the anchor pin 32. Cam 60 may be square or rectangular, or have an S-shape, by way of example. For simplicity, it is here shown as a square. The opposite sides of the cam 60 are engaged by the shoe ends 28 and 30, so that as the parking brake activation arm 14 is pivoted about the anchor pin, the shoe ends 28 and 30 are spread apart, engaging the shoe linings 48 and 50 with the inner surface 52 of the brake drum 16, actuating the brake in the parking brake mode.

In the typical duo-servo brake, the parking brake activation arm is located in close conjunction with the primary brake shoe 20 (or the equivalent leading brake shoe in a leading-trailing brake), and a parking brake cable is attached to the end of the parking brake activation arm which is circumferentially opposite to the wheel cylinder and anchor pin. Thus in such a typical brake the parking brake activation arm would be located adjacent to the web 44 of the primary shoe 20, and the parking brake cable, when tensioned to apply the parking brake, would pull the activation arm lower end leftwardly as seen in FIG. 1, spreading the shoes apart as earlier described to activate the parking brake mode.

In a brake embodying the parent patent invention as illustrated in FIG. 1, the parking brake activation arm may be located adjacent either shoe web 44 or shoe web 46. It is illustrated as being adjacent shoe web 46 of the secondary shoe 22. Instead of having an arrangement connecting the end of a parking brake cable to the activation arm, as shown in U.S. Pat. No. 2,924,116-Abbott, for example, the magnetic assembly 12 is provided on the end of the activation arm. This general arrangement is disclosed in U.S. Pat. Nos. 2,304,118-Phair; 3,134,463-Birge; 3,244,259-Brede III, et al; 3,668,445-Grove; 3,760,909-Grove; and 4,004,262-Grove, by way of example. In a brake embodying the parent patent invention as illustrated in FIG. 1, the parking brake activation arm may be located adjacent either shoe web 44 or shoe web 46. It is illustrated as being adjacent shoe web 46 of the secondary shoe 22. With that background on the parent patent disclosure, the detailed description of the present invention is now presented.

Figure 2:
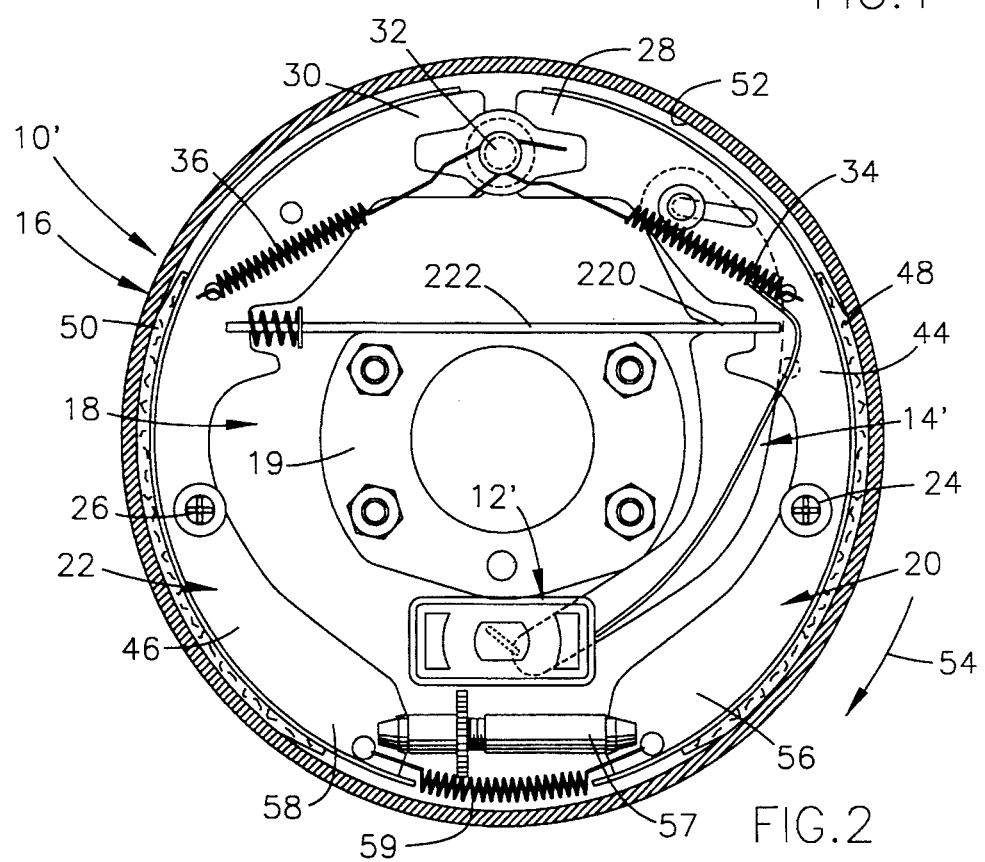
FIG. 2 is an elevation view of a brake assembly embodying the invention herein disclosed and claimed, that assembly being somewhat similar to the brake assembly of FIG. 1, having parts illustrated in section and showing a modified magnetic assembly on the end of the brake actuating arm.

FIG. 2 shows a duo servo drum brake assembly 10' somewhat similar to the brake mechanism 10 shown in FIG. 1. The wheel brake assembly 10' of FIG. 2 is also a typical duo-servo drum brake, except for the magnetic assembly 12', sometimes referred to as an electromagnetic assembly (even though it has some permanent magnets in it) or an EMA, and a modified brake activation arm 14'.

In FIG. 2, a rotatable brake drum 16 is secured to a vehicle wheel (not shown) for rotation with the wheel. A brake assembly backing plate 18 is secured to the axle housing 19 so as to be relatively fixed against movements in relation to the vehicle. A primary brake shoe 20 and a secondary brake shoe 22 are mounted on the backing plate 18 by means of hold-down spring assemblies 24 and 26. The upper adjacent ends 28 and 30 of the brake shoes 20 and 22 are in engagement with the anchor pin 32, which is mounted so as to be fixed on the backing plate 18. Brake shoe return springs 34 and 36 are respectively attached to the brake shoes 20 and 22 at one spring end and to the anchor pin 32 at the other spring end. They are in tension, and therefore continually urge the brake shoe ends 28 and 30 toward engagement with the anchor pin 32, always at least urging the brake shoes toward the retracted, brake-released position.

As is well known in the art, when the brake shoes 20 and 22 are moved arcuately away from anchor pin 32, the brake shoe linings 48 and 50 engage the inner surface 52 of the brake drum 16. The primary shoe 20 then tends to move arcuately in the direction of rotation of the brake drum, indicated by arrow 54, with its other end 56 pushing through the brake adjuster screw 57 to the other end 58 of the secondary shoe 22, causing the secondary shoe to move arcuately, again engaging the shoe end 30 with the anchor pin 32. As is common practice, a brake shoe adjuster spring 59, attached to the ends 56 and 58 of the shoe webs 44 and 46, continually urges those ends into engagement with the adjuster 57. The mechanical multiplication of braking force by this action of the primary shoe on the secondary shoe is the second servo action of a duo-servo brake. The mechanical action of the brake activation arm 14 being the first servo action.

If the brake assembly were to be of the leading-trailing type, the lower ends 56 and 58 of the shoes would engage an anchor fixed to the backing plate, the adjuster 57 would be eliminated, and only the mechanical servo action of the brake activation arm 14 on the shoes 20 and 22 would be obtained.

Parking brakes are usually provided on at least either the front or rear wheels of an automotive vehicle, commonly as a part of the service brake at each such wheel. They may also be provided as a part of the service brakes for all the wheels of a trailer, including those with multiple axles having wheels on the outer ends of each axle. When the brakes for these wheels are drum brakes, the service brake shoes are separately actuated for parking purposes. However, in the invention herein disclosed and claimed, and as shown in FIG. 2 as well as in other FIGURES of the drawings, the service brake mode of operation and the parking brake mode of operation use the same brake actuation and release mechanisms. Brakes embodying the invention can well be employed even on wheels where parking brakes are not normally provided.

A parking brake activation arm 14' is provided, and, as is described later below, and contrary to the arm 14 of the parent patent disclosure shown in FIG. 1, is also the service brake activation arm. It is either pivoted on the anchor pin 32 and provided with a brake shoe actuating cam such as cam 60 of FIG. 1, or, as shown in this FIG. 2, has a slot in its upper end which slides on a pin on a brake shoe web, and is at times pivotable against another pin on that shoe web and at other times is pivotable on the end 220 of a spreader strut or bar 222 extending between the shoe webs near the shoe ends 28 and 30. If the spreader strut is used (and it is in the disclosure of FIG. 2), it is typically located in the space which is under the location of the wheel cylinder of FIG. 1. It has forked ends receiving parts of the shoe webs 44 and 46 at notches in the shoe webs, with the parking brake activation arm also received in the forked end 220 engaging the shoe web 44 of the primary brake shoe 20. Alternatively as noted above, and as in the manner schematically illustrated in FIGS. 3, 4 and 6, cam 106, like that in FIGS. 3, 4 and 6 on arm 100, 130 or 150 of those respective FIGURES, may be provided on the end of the service and parking brake activation arm near the anchor pin 32. Cam 106 of FIGS. 3, 4 and 6 may be square or rectangular, or have an S-shape, by way of example. For simplicity, it is here shown in those FIGURES as a square. The opposite sides of the cam are engaged by the shoe ends 28 and 30, so that as the service and parking brake activation arm is pivoted about the anchor pin, the shoe ends 28 and 30 are spread apart, engaging the shoe linings 48 and 50 with the inner surface 52 of the brake drum 16, actuating the brake in the either the service brake mode or the parking brake mode.

In the typical duo-servo brake, the parking brake activation arm is located in close conjunction with the primary brake shoe 20 (or the equivalent leading brake shoe in a leading-trailing brake), and a parking brake cable is attached to the end of the parking brake activation arm which is circumferentially opposite to the wheel cylinder and anchor pin. Thus in such a typical brake the parking brake activation arm would be located adjacent to the web 44 of the primary shoe 20, and the parking brake cable, when tensioned to apply the parking brake, would pull the activation arm lower end leftwardly as seen in FIG. 2, spreading the shoes apart as earlier described to activate the parking brake mode.

In the brake of the parent patent and as shown in FIG. 1, the EMA must be electrically energized to move it from the brake released position to the parking brake position. Once in that position, the permanent magnets of the EMA hold the EMA in engagement with the brake drum hub without having to keep the electromagnets of the EMA electrically energized. The EMA must again be electrically energized to move it from the parking brake position to the brake released position, after which the permanent magnets of the EMA will hold the EMA in operative engagement with the backing plate without having to keep the electromagnets of the EMA electrically energized. Thus, such an EMA is a bi-stable mechanism, staying in the position assumed even after the electromagnets are no longer electrically energized.

However, in the invention now disclosed and claimed, the EMA is a mono-stable mechanism, always assuming the parking brake position by the magnetic force of its permanent magnets when there is no electrical energization of the EMA electromagnets. It is moved to the brake-released position, and held there, only by appropriate energization of its electromagnets as to modify its magnetic flux and force so that it is moved away from the brake drum hub surface to which, when under the influence of only the permanent magnets, it is magnetically latched.

FIG. 3 schematically shows a brake activation arm 100 having one end 102 pivotally mounted on a pin 104. This pin may be the anchor pin of the brake assembly of which arm 100 is a part. Typically, such an anchor pin is secured to the fixed backing plate of the brake assembly. Arm end 102 is also schematically illustrated as having a brake shoe actuation cam 106 mounted on it so that it can cause the brake shoes of the brake assembly to be moved outwardly to engage the brake drum friction surface of the brake assembly in the same manner as does cam 60 of FIG. 1. Since this arrangement is well known and fully described in the parent patent noted above, no further description of it is considered necessary.

The body 108 of arm 100 extends near a brake shoe web in a manner generally similar to the body of arm 14 of FIGS. 1 and 2, so that its free or other end 110 is positioned substantially diametrically opposite its pivot end 102. Arm end 110 is positioned adjacent to and in alignment with (as seen in FIG. 3) the surface 112 of brake drum hub 114, which is an annular, disc-like surface formed on the brake drum hub. This is a friction surface, but is not the friction surface of the brake drum which is engaged by the brake shoes to obtain braking action. It is provided on the disc-like part of the brake drum hub which joins the shoe-engageable friction braking surface to the center part of the brake drum. A similar friction surface is provided on the hub of brake drum 16 of FIGS. 1 and 2 for engagement of the brake assembly magnetic assembly 12, as is more fully disclosed in the parent patent noted above.

A magnetic assembly 116, also known as an electromagnetic assembly or EMA, having both permanent magnets and electromagnets and more fully shown in later-described FIGURES of this disclosure, is pivotally mounted on the arm end 110 as will be further described. For the present purpose, magnetic assembly 116 of FIGS. 3 and 11–14 may be any of the magnetic assembly schematic or realistic structural configurations more specifically disclosed either fully or in part in FIGS. 18–29 described below, and may be used in the electrical schematic control systems of FIGS. 30 and 31 also described below.

It is one of the aspects of the invention herein disclosed and claimed that the magnetic assembly 116 be pivotally mounted on brake arm free end 110 for controlled pivotal action when the brake assembly of which it is a part is actuated, as shown in dashed lines in FIG. 3, and that it be returned to the brake-released position shown in that FIGURE in solid lines when the brake assembly is deactuated. It is readily seen and illustrated in FIG. 3 that the radius 118 of pivotal movement of the brake arm free end 110 mounting center pivot point 120 of the magnetic assembly 116 extends from the axis of rotation of the arm pivotal end 102 to pivot point 120. Therefore, radius 118 is the effective operating length of the brake activation arm. However, the brake drum, including its hub 114 and the hub surface 112, rotates about the axis 122 of brake drum hub rotation, and the radius 124 of rotation of the pivot point 120 as the brake arm free end 110 is moved rightwardly as shown by the right end of double-ended arrow 126. Under controlled pivotal movement of the magnetic assembly, details of which are set forth below, it also pivots so that its effective radius of pivotal movement is that of radius 124, as shown by the right end of double-ended arrow 128. In typical installations radius 118 may be from about 50% to as much as 90% longer than radius 124. In all installations it is substantially larger.

In dynamic brake applications wherein the magnetic assembly is energized for service braking to slow down or stop a moving vehicle, it is not a concern if the magnetic assembly does not rotate since it slides on the brake drum hub surface 112. However, in static brake applications such as when the vehicle is stopped and the brake is activated in the parking brake mode, the lack of magnetic assembly rotation yields a less efficient braking action. It takes less force to rotate a first friction surface in relation to a second friction surface with which it is frictionally engaged than it does to slide the first friction surface on the second friction surface. This is due to the operating forces and characteristics of torque versus straight line linear forces operating on a friction surface. Once the device being braked begins to move, rotating the brake drum in the brake assembly of either FIG. 1 or FIG. 2, and of brake assemblies of which structures of the type herein disclosed are a part, the static friction of the surfaces changes to dynamic friction and the effective coefficient of friction changes. If the rotational action of the first friction surface can be eliminated so that there is insipiently, in the static condition, and actually in the dynamic condition, no rotational movement of the first friction surface relative to the second friction surface, and only sliding movement then occurs, the effectiveness of a static brake as it becomes a dynamic brake can be substantially increased.

This is accomplished in accordance with certain aspects of the invention herein disclosed and claimed by causing the magnetic assembly 116 to be controllably rotated relative to the brake arm free end 110 during dynamic braking action so that it maintains sliding action in its frictional engagement with the brake drum hub surface 112 but does not have any substantial component of rotational movement, either incipiently in the static condition or actually in the dynamic condition, thus keeping the brake actuating force generated by it at all times in the higher force level obtained by substantially only sliding movement than is obtained by having a component of rotational movement. While the concept and result of these aspects of the invention are shown in FIG. 3, details of how this may be done are shown in later-described drawing FIGURES.

FIG. 4 shows one construction of the brake activation arm which provides a mounting for controlling the rotational movements of the EMA 116 relative to the free end of the arm. The brake activation arm having this construction is identified by reference character 130. Its pivotal end 102 is pivotally mounted on anchor pin 104 and has cam 106 mounted on it near the pin 104 as in FIG. 3, and its body 108 is like that of arm 100 of FIG. 3.

The free end 110 of the arm has a pivot hole 132 in approximately the center of the end so that it is spaced from the axis of the anchor pin 104 by the length of radius 118. Thus the length of radius 118 is the effective operating length of the arm 120. Arcuate slots 134 and 136 are formed in the arm free end 110 on opposite sides of a circle centered on the axis of pivot hole 132 and extending generally vertical as seen in FIG. 4. These slots, taken together, appear similar to a pair of parentheses indicating an open-parenthesis and a closed-parenthesis having the pivot hole therebetween, and formed on opposed arcs of a circle whose center is the axis of pivot hole 132. The EMA is not shown mounted on the arm free end; however, it would be mounted on the arm free end face 138 located on the other side of the free end 110 from free end face 140, which is exposed to view in FIG. 4. Face 138 is here introduced and indicated on the drawing by using a dashed line from the reference number on the drawing to the arm free end to indicate the back side or face of that arm free end which is not in view. The edge view of face 138 is visible and identified in FIG. 5.

As better seen in FIG. 5, slots 134 and 136 are stepped so that their respective peripheral stepped outer slot portions 142 and 144 open through arm free end face 140 and the smaller stepped portions extend from approximately the center of the thickness of the arm free end 110 so as to open through arm free end face 138. Similarly, pivot hole 132 is stepped so that its larger stepped portion 146 opens through arm free end face 140. FIG. 14, later described, illustrates the pivotal mounting of the EMA 116 of FIG. 3, or the EMA to be mounted on the arm free end 110 of FIG. 4.

If the arm 130 were to be mounted as shown in FIG. 2 so as to be adjacent the other brake shoe assembly 20 from that which it (and the one in FIG. 3) is adapted to be used, then the stepped outer slot portions 142 and 144 would open through the arm free end face 138 and the smaller slot portions of slots 134 and 136 would open through the arm free end face 140. The same is also true for the smaller portion of stepped pivot hole 132 and the larger stepped hole portion 146. This type of arrangement is shown in FIGS. 6 through 10a described below, in relation to another pivoting and guide slot arrangement.

FIG. 6 shows a brake activation arm 150 which is generally similar to arm 130 of FIGS. 4 and 5, with a different pivot hole and guide slot arrangement. Also, this arm is adapted to be adjacent to the opposite brake shoe from the brake shoe that arm 130 would be near. Therefore, while the view in FIGS. 3 and 4 is toward the brake drum hub, the view in FIG. 6 (as well as FIGS. 9 and 9a to be described) is from the vantage point of the brake hub surface 112. Brake arm 150 of FIG. 6 has a similar pivot end 102, pivoted on anchor pin 104, and a cam 106 mounted thereon. Its body 108 curves to the free end 110, which is substantially diametrically opposite the pivot end 102, as before, of course considering the mirror image reversal noted above as compared to FIGS. 3 and 4.

The free end 110 of arm 150 has a vertically extending (as seen in the drawing FIG. 6) stepped slot 152 with the smaller portion of that slot opening through the arm free end face 154 and its larger stepped portion 156 opening through the arm free end face 158, not seen in FIG. 6 but seen in edge view in FIGS. 7 and 8. Another slot 160 is positioned above slot 152 (toward the arm pivot end 102) in the arm free end 110. It is also a stepped slot, with the smaller slot portion 161 opening through arm free end face 154 and the larger slot portion 161 opening through arm free end face 158. Slot 160 is a wavy slot, with curved outer portions 162 and 164 having centers of curvature on the side thereof toward the elongated slot 152, these curved outer portions 162 and 164 being joined by a curved inner portion 166 having its centers of curvature on the side thereof toward the arm pivot end 102. These curved portions are not necessarily arcs about a single center of curvature, but are formed on developed curves. This slot is sometimes referred to as an "M" slot, since it is reminiscent of a flattened, curved M. It also reminds one of two eyebrows joined together in the center. The precise shapes of the slot portions are designed to obtain the desired amount of rotation of an EMA on the free end 110 of the arm 150 as the arm is moved during dynamic braking action in the manner shown in FIG. 3. Of course, in the view of FIG. 10, the arm free end would be moving to the left of that FIGURE during brake actuation rather than to the right as shown in FIG. 3 so as to be mirror-image compatible with that showing. The rotation of the EMA would be controlled by the elongated slot 152 and the slot portion 162 of slot 160. If it did move to the left as seen in FIG. 6 because the brake drum with which it is associated moves clockwise, as seen in FIG. 6, to the structure of FIG. 6, then the EMA would rotate under control of the elongated slot 152 and the slot portion 164 of slot 160. This is further described below in relation to FIGS. 9 and 9a.

FIG. 7 shows the cross sections of the slots 152 and 160 and their larger slot portions in relation to the faces 154 and 158 of the arm free end 110. FIG. 8 shows only the cross section of the elongated slot 152 and that slot's relation to the faces 154 and 158 of arm free end 110.

FIGS. 9 and 9a schematically illustrate the control of the rotation of the EMA relative to the arm free end 110 by means of the slots 152 and 160. FIG. 9 shows the EMA as a vertical line 170 connecting two slides 172 and 174, respectively received in slots 152 and 160, with the brake assembly in the brake-released position. The EMA is therefore centered on the arm free end 110 much as shown in solid lines in FIG. 3. It is effectively controlled by the slots during its rotational movements as if it had a pivot point 176, and extended to that point, which point is effectively located at the axis of rotation 122 of the brake drum hub which is associated with the structure, but not shown for simplicity. At times it is desirable to provide a physical link 170', effectively a part of the EMA 170, and the pivot point 176 in order to forcibly direct the rotation of the EMA on the arm free end 110 as the brake arm is moved in the brake actuating direction as well as in the brake releasing direction. The schematic line 170' between the slide 174 and the pivot point 176 may be considered to be such a link. In that instance, the pivot point 176 may be located on the brake assembly backing plate, preferably near the axis of rotation of the brake drum.

As with FIGS. 3, 4 and FIGS. 9 and 9a are looking at the arm free end 110 and the schematic EMA 170 from the vantage point of the brake assembly backing plate 18, which is located out of the plane of the drawing toward the observer.

When the brake drum rotates in a counterclockwise direction in relation to the structures of FIGS. 3, 4, 6, 9 and 9a, it drags the EMA rightwardly as seen, and tends to cause rotation of the EMA in a counter-clockwise direction in relation to the arm free end 110. The amount of such counter-clockwise rotation of the EMA is controlled and limited against other than the desired rotation by the slides and their movements in slot 152 and the leftward portion 162 (as seen) of slot 160. By the developed curves of slot portion 162, the rotation of the EMA actually occurring in relation to the arm free end 110 is such that the EMA stays in substantially the same alignment with the radius comparable to radius 124 of FIG. 3, thus maintaining its primarily sliding presentation to the brake drum hub surface 112 with which it is engaged as a drag clutch. As the brake is being released and the brake activation arm is returned to its neutral position, the camming action of the slides and the slots return the EMA to the neutral position shown in FIG. 9. If the braking action occurs with the brake drum hub rotating clockwise in relation to the view of FIGS. 6, 9 and 9a, then the slot 152 and the slot portion 164, acting on the slides 172 and 174 secured to the EMA, would control the rotation of the EMA in the opposite rotational direction relative to the arm free end 110, with the same desired result.

FIGS. 10 and 10a show the manner in which the EMA is mounted for sliding guidance with the slots. Only the EMA magnetic backing plate portion is shown in FIG. 10a, with the magnetic array comprised of various permanent magnets and electromagnets not being shown. Several variations of this magnetic array, as well as variations of the magnetic backing plate, are disclosed and described in relation to other FIGURES of the drawing. The slides 172 and 174 are stepped sleeves with fasteners such as screws 177 and 178 respectively extending through them and secured to the magnetic backing plate 180. The stepped arrangement of the slots and the sleeves in cooperation with the fastening of the screws to plate 180 keep the slides within the appropriate slots. The magnetic backing plate 180 is made of a magnetic-sensitive material and has permanent magnets 182 and 184 mounted on it. These permanent magnets, via their opposite-sign poles (e.g., one North and one South) in contact with plate 180 establish a magnetic path through the plate 180. This construction will be further described below.

FIGS. 11, 12 and 13 schematically illustrate the operation of a brake activation arm 200 with the EMA 202 installed on its free end 204 in accordance with one of the previously-described arrangements. The view in each of these FIGURES is from the vantage point of the brake drum hub surface 112, which is located out of the plane of the drawing toward the observer. In this arrangement, the arm is installed as shown in FIG. 2, rather than being pivotally mounted on the anchor pin with a cam to force both adjacent ends of the brake shoes apart for brake actuation as in FIGS. 3, 4 and 6. The upper end 206 of the arm is provided with an elongated slot 208 which receives a pin 210 secured to the brake shoe web 212 at the upper end of the brake shoe assembly 214. A notch 216 in one side of the arm body 218 below the slot 208 receives one end 220 of a spreader bar 222. The other end of bar 222 is similarly engaged with the other shoe 22 (not shown here but shown in FIG. 2) of the brake assembly of which the arm 200 is a part. A recess 224 formed in the other side of the arm body 218 below the notch 216, and therefore nearer the arm free end 204, mates with another pin 226 secured to the brake backing plate 228 so as to be pivotable thereagainst. The EMA is positioned in the brake assembly to be engageable with a friction surface of the assembly brake drum hub as shown in FIG. 3. The brake assembly is therefore like the assembly of FIG. 2, with similar brake shoes, shoe retracting springs, adjuster, adjuster spring, brake activation arm, spreader bar, and brake drum, etc. It has no hydraulically actuated wheel cylinder, and the brakes are actuated in the service braking mode by energization of the EMA, and in the parking brake mode by electrical deenergization of the EMA.

If the brake drum hub is rotating clockwise as indicated by the arrow 230 of FIG. 12, and the EMA 202 is controlled so as to engage the hub in magnetic latching mode, the EMA is pulled leftwardly in the direction of arrow 230 while being rotated as shown by arrows 232 and 234, moving the arm free end 204 leftwardly. As the arm recess 224 moves away from pin 226, arm 200 exerts force on the spreader bar end 220 and pivots about that end, moving the arm upper end 206 rightwardly so that it exerts force against pin 210, moving the upper end of brake shoe assembly 214 in the direction of arrow 236 until it engages the brake lining 238 against the drum friction braking surface. The arm 200 then pivots about pin 210, exerting force against the spreader bar end 220 in the direction of arrow 240 and forcing the other brake shoe assembly into braking engagement with the drum friction braking surface.

Upon brake release, the brake shoe retracting springs (34 and 36 in FIG. 2) pull the shoe assemblies back to the brake released position. In particular, brake shoe assembly 214 is moved in the opposite direction from that indicated by arrow 236. In doing so, pin 210 moves the arm upper end 206 leftwardly at the same time that the other brake shoe assembly pushes the spreader bar 222 rightwardly in the opposite direction to that indicated by arrow 240, causing the arm 200 to pivot about pin 210 in a counter-clockwise direction as seen in FIG. 12 until it reengages its notch 224 against pin 226. Thus, the brake arm 200 and the EMA 202 are returned to the position shown in FIG. 11.

When the brake drum hub is rotating counterclockwise as indicated by the arrow 242 of FIG. 13, and the EMA 202 is controlled so as to engage the hub in magnetic latching mode, the EMA is pulled rightwardly in the direction of arrow 242 while being rotated as shown by arrows 244 and 246, moving the arm free end 204 rightwardly. This causes the arm to pivot about pin 226 as indicated by arcuate arrow 248 causing, the slot 208 to slide leftwardly until the pin 210 engages the right end of that slot, while also exerting force against the spreader bar end 220 and urging the spreader bar 222 leftwardly as indicated by arrow 240. When the other brake shoe engages the brake drum in braking relation, the arm 200 then pivots about the spreader bar end 220, pushing against pin 226 and moving the upper arm end 206 rightwardly until pin 210 is again located in slot 208 as shown in FIGS. 11 and 12. Continued rightward movement of arm end 206 moves the brake shoe assembly 214 rightwardly until it engages the brake lining 238 against the drum friction braking surface. Upon brake release, the shoe assemblies and the brake arm 200, with the EMA 202, are moved back to the brake release position of FIG. 11 in a manner similar to that described in conjunction with FIG. 12.

FIG. 14, earlier referred to, shows the pivotal mounting of the EMA 116 or 202 on the arm free end 110 of FIG. 4 or the arm free end 204 of FIGS. 11, 12 and 13 (assuming that end 204 is constructed as is end 110). The arm free end 110 (or 204) pivot hole of FIG. 4 is the stepped hole 132 having a larger stepped part 146. A stepped sleeve 250 similar to stepped sleeve 172 of FIG. 10a is rotatably received in hole 132. A screw or other fastener 252 similar to screw 177 of FIG. 10a fits into the sleeve and is secured to a magnetic backing plate 254 of an EMA, similar to plate 180 of FIG. 10a, in the center pivoting position of the EMA as shown in FIG. 3 and as contemplated by the structure of FIG. 4.

FIGS. 15 and 16 show two modified arrangements for cam surfaces on the ends of brake shoes such as upper shoe ends 26 and 28 of FIGS. 1 and 2 or the arrangement utilized with the brake arm shoes-engaging cam 106 of FIGS. 3, 4 and 6. In FIGS. 15 and 16, the pivot end 260 of a brake activation arm 262, such as earlier described brake arms 106 in FIGS. 3, 4 and 6, is pivotally mounted on the anchor pin 264. The upper ends 266 and 268 of the brake shoe webs 270 and 272 of brake shoe assemblies 274 and 276 are similarly shaped with one being in the mirror image of the other. In the brake released position they either abut each other or are immediately adjacent to each other in the area of the anchor pin 264.

In FIG. 15, the upper portions of the shoe web ends are recessed at 278 and 280 so as to be shaped like one side of the letter "U". In their juxtaposed position shown, the two recesses define a U-shaped recess, the sides 282 and 284 of which are cam surfaces engaged or engageable by the rotatable cam 286 mounted on the pivotal arm end 260. When the arm is pivoted about anchor pin 264, the cam 286 rolls against and pushes on one of the cam surfaces 282 or 284, moving the shoe so pushed in the brake actuation direction.

In FIG. 16, the two recesses 288 and 290 are shaped much like half of a classic heart shape. In their juxtaposed position shown, the two recesses define a generally heart shaped recess with the point extending away from the anchor pin 264. The sides of the two recesses define cam surfaces 292, 294 and 296. The cam 286 is received in the heart-shaped recess and is positioned near the pointed end of the recess when the brake is in the brake-released position. It is either in engagement with the cam surfaces 292 and 294 or closely adjacent to one or both of them. When the arm is pivoted about anchor pin 264, the cam 286 rolls against and pushes on one of the cam surfaces 292 or 294, moving the shoe so pushed in the brake actuation direction. The tapered cam surfaces 292 and 294 are angled so as to increase the mechanical advantage in cooperation with the force vectors created.

FIG. 17 schematically shows two axles 300 and 302 of a vehicle such as a trailer. Axle 300 has wheel brakes 304 and 306 on it, and axle 302 has wheel brakes 308 and 310 on it. One brake electrical control lead 312 is connected to brake 304 and then by electrical control lead 314 to brake 310. Another brake electrical control lead 316 is connected to brake 306 and then by electrical control lead 318 to brake 308. When electrical power is supplied to the EMA of brake 304 on axle 300 through electrical control lead 312, it is also supplied to the EMA of the diagonally opposite brake 310 on the other axle 302 through electrical control lead 314. When electrical power is supplied to the EMA of brake 306 on axle 300 through electrical control lead 316, it is also supplied to the EMA of the diagonally opposite brake 308 on the other axle 302 through electrical control lead 318. This arrangement insures that failure of one brake control circuit will not result in the brakes on that circuit being applied while the others remain in the brake released condition, permitting better braking control of the vehicle under such conditions.

FIG. 18 shows an EMA 320, the general configuration of which is the same as those shown in FIGS. 19 and 24 through 49. Therefore the basic parts will be identified so that the same reference characters can be used for comparable elements throughout these FIGURES. All of these EMAs are shown in a simplified form in which the magnetic array is a single H-shaped group of permanent magnets and electromagnet armatures.

The EMA operates in conjunction with the brake drum hub 322, and particularly with an annular hub surface 324 in juxtaposition to one operating face of the EMA. Such a hub surface is also shown schematically in FIG. 3 as surface 112 on hub 114. The EMA 320 includes a magnetic backing plate assembly 326 and a magnetic array 328. The magnetic backing plate assembly may have any of several configurations such as those shown in FIGS. 25 through 28, described below. The configuration shown in FIG. 18 is that also shown in FIG. 26. It includes a magnetic backing plate 330 which is made of a suitable magnetic-sensitive material which can easily transmit magnetic flux but is of itself not a permanent magnet. Permanent magnets 332 and 334 are secured to the plate 330 so as to be in magnetic and physical engagement alignment with the faces of two of the armatures of electromagnets of the magnetic array. Magnet 332 has its South magnetic pole 336 in contact with plate 330, and its North magnetic pole 338 in the face of the magnetic backing plate assembly which in turn faces a face of the magnetic array. The potting material that may be used with the magnetic backing plate assembly and with the magnetic array is not shown in these FIGURES. However, it is schematically shown in FIG. 10a but is not further identified. Magnet 334 has its North magnetic pole 340 in contact with plate 330, and its South magnetic pole 342 in the face of the magnetic plate assembly which in turn faces a face of the magnetic array.

The magnetic array 328 has two pole pieces 344 and 346 and a cross bar 348 joining the two pole pieces at approximately their midpoints.

Pole piece 344 has three parts: part 350 at the pole piece end facing permanent magnet 332 and having an end face 352; part 354 at the pole piece end facing brake drum hub surface 324 and having an end face 356; and center part 358 connecting parts 350 and 354 and to the side of which one end 360 of the cross bar 348 is connected.

Pole piece 346 also has three parts: part 362 at the pole piece end facing permanent magnet 334 and having an end face 364; part 366 at the pole piece end facing brake drum hub surface 324 and having an end face 368; and center part 370 connecting parts 362 and 366 and to the side of which the other end 372 of the cross bar 348 is connected.

The cross bar 348 is a permanent magnet, so that its end 360 is, in this instance, a magnetic North pole having a predetermined flux density caused by the permanent magnetism of the cross bar 348, and its end 372 is similarly a magnetic South pole having a predetermined flux density caused by the permanent magnetism of the cross bar 348. Since the cross bar permanent magnetic North pole is in magnetic engagement with pole piece 344, that pole piece, absent any electromagnetic influence, is a magnetic North pole. Likewise, since the cross bar permanent magnetic South pole is in magnetic engagement with pole piece 346, that pole piece, absent any electromagnetic influence, is a magnetic South Pole. It must be noted, however, that when the cross bar is also the armature of an electromagnet, as it may be in some configurations, the flux density values and even the North or South signs of the effective magnetism of the cross bar 348 can be changed.

In the configuration of FIG. 18, there are five electromagnets respectively noted on the drawing as EM1, EM2, EM3, EM4 and EM5. The windings 374 forming EM1 are wound about pole piece part 350. Electrical control lead 376 is connected to one end of winding 374 to receive electrical current to energize the electromagnet EM1.

The windings 378 forming EM2 are wound about pole piece part 354, and are electrically connected in series with windings 374 by winding section 380. Windings 378 are also connected with electrical control lead 379. In FIG. 18, windings 374 and 378 are wound in the same direction so that the electromagnetic effect on pole piece parts 350 and 354 results in pole piece 344 having electromagnetically induced magnetic North flux at one pole piece end face and magnetic South flux at the opposite pole piece end face. Thus if the direction of the electrical current flow in windings 374 and 378 are in one direction, face 352 will have a component of electrically induced magnetic North flux induced at it and face 356 will have a component of electrically induced magnetic South flux induced at it. A reversal of electrical current flow will result in a reversal of these electromagnetically induced magnetic fluxes.

The windings 382 forming EM3 are wound about pole piece part 362. Electrical control lead 384 is connected to one end of windings 382 to receive electrical current to energize the electromagnet EM3.

The windings 386 forming EM4 are wound about pole piece part 366, and are electrically connected in series with windings 382 by winding section 388. Windings 386 are also connected with electrical control lead 387. In FIG. 18, windings 382 and 386 are wound in the same direction so that the electromagnetic effect on pole piece parts 362 and 366 results in pole piece 346 having electromagnetically induced magnetic North flux at one pole piece end face and magnetic South flux at the opposite pole piece end face. Thus if the direction of the electrical current flow in windings 382 and 386 are in one direction, face 364 will have a component of electromagnetically induced magnetic North flux induced at it and face 368 will have a component of electromagnetically induced magnetic South flux induced at it. A reversal of electrical current flow will result in a reversal of these electromagnetically induced magnetic fluxes.

The windings 390 forming EM5 are wound about cross bar 348. Electrical control leads 392 and 394 are connected to the ends of windings 390 to transmit electrical current to energize the electromagnet EM5. Since cross bar 348 is also a permanent magnet as well as the armature for EM5, the permanent magnetism magnetic component in it will be modified with electrical energization of the windings 390. In one direction of current flow in these windings, the permanent magnetism of cross bar may be augmented. In the other direction of such current flow, the permanent magnetism of cross bar 348 may be diminished or even overcome so as to reverse the effective magnetism of cross bar 348. Of course, any such electromagnetic energizations correspondingly effect the magnetism components transferred from the cross bar 348 to the pole pieces 344 and 346.

Figure 29:
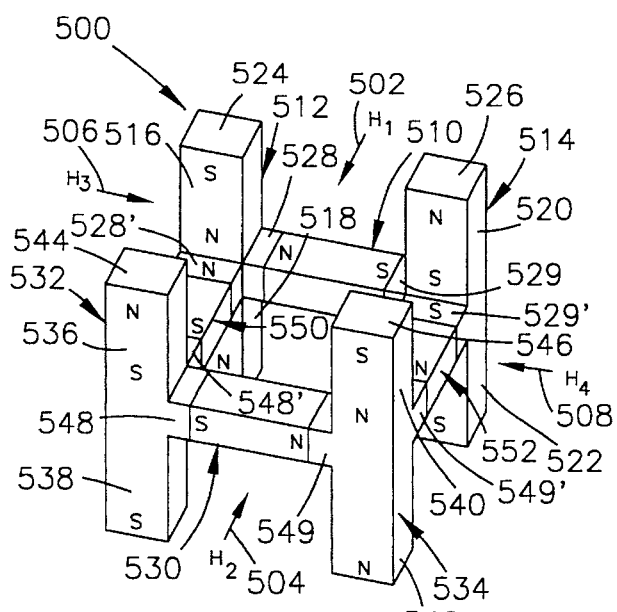
FIG. 29 is an example schematically showing how various pole pieces and cross bars comprising permanent magnets and electromagnets may be integrated to provide more powerful magnetic arrays.

In a magnetic array wherein the arrangement of permanent magnets and electromagnets is as shown in FIG. 18, the electromagnets EM1, EM2, EM3 and EM4 around the pole pieces 344 and 346 are in a 90° relationship to the cross bar permanent magnet 348 and also to the electromagnet EM5 around the cross bar permanent magnet. The number of magnets and pole pieces can be increased using the same principle and relationship to form a more complex magnetic matrix. The matrix in FIG. 29 is illustrative of this capability.

The magnetic circuit of the magnetic array 328 is a split pole configuration with two magnetic pole faces 352 and 356 for pole piece 344 being of the same magnetic polarity (shown here as North polarity). Likewise, the two magnetic pole faces 364 and 368 for pole piece 346 are of the same magnetic polarity (shown here as South polarity). The magnetic field of the permanent magnet 348 is divided between each pole piece 344 and 346. The strength of the permanent magnet component of the magnetic field at each pole face 352, 356, 364 and 368 is dependent upon (a) the area of each such pole face, (b) the length of the magnetic circuit from the permanent magnet to the particular pole face, (c) the permeability of the magnetic material of the pole pieces 344 and 346, and (d) the magnetic strength of the permanent magnet 348.

This split pole design provides two operating faces for the mono-stable EMA. One operating face, comprised of pole faces 352 and 364 and facing the magnetic backing plate 326, has North polarity at 352 facing the North polarity of the magnetic backing plate permanent magnet face 338 and South polarity at 364 facing the South polarity of the magnetic backing plate permanent magnet face 342.

The other operating face, comprised of pole faces 356 and 368 and facing the brake drum hub surface 324, has North polarity at 356 and South polarity at 368. The brake drum hub, at least in the area of its surface 324, is made of a magnetic-sensitive material. Typically, all of the magnetic-sensitive materials used are ferrous materials, but other well-known magnetic-sensitive materials may also be used as appropriate.

By way of example, but not of limitation, a permanent magnet may be an "Alnico" magnet or a ceramic magnet based on rare earth materials. In the 1950s the magnetic material Alnico 5DG was commercially available with a maximum energy product (MGOe) of approximately 6.25. This material was followed by Alnico 5, Alnico 6 and Alnico 7 in the early 1960s. Alnico 7 had a minimum energy product of 7. By the 1970s, a new class of magnets were available based on rare earth materials (the Lanthanides), and specifically Samarium and Neodymium. By 1985, magnetic materials which had a maximum energy product of 35 MGOe were commercially available. The development of rare earth magnets created a new era of magnetic design, reducing previously large and heavy components to more cost effective miniaturized designs. Magnetic materials of increased maximum energy product continue to be developed. Until the advent of Samarium Cobalt ($SmCo_5$) and Neodymium-Iron-Boron (NdFeB) magnets, magnetic materials were not available with sufficient strength to make electro/permanent magnet brake device feasible.

Currently, the most powerful magnetic material available for such applications is a sintered Neodymium-Iron-Boron magnet with an energy product of 45 MGOe and a residual magnetic strength of about 13,500 Oersteds. Such a magnet will have an attraction force of $F = 0.58 \cdot Br^2 \cdot \sqrt{A} \cdot Lm$ where:

F=Force in pounds

Br=Residual flux density in Kgauss

A=Pole Area square inches

Lm=Magnetic Length of magnet in inches

Substituting in the formula: Br=13.5 A=0.25 Lm=1.0 gives an attraction force F of such a magnet of 53.4325 pounds. Note that if the magnet were only 0.5 inch long, the magnet would have only half of the attractive force F. However, if the Pole Area of 0.25 $in^2$ were decreased by half to 0.125 $in^2$, its square root would decrease from 0.5 only to 0.35355, so that the magnet would have only about 30% less attractive force F.

For convenience hereafter, all such magnetic-sensitive materials will be referred to as ferrous material, it being recognized that all such materials do not actually have iron in them and the use of this term of convenience does not limit the use of magnetic-sensitive materials to only those actually having iron in them.

When an operating face of the magnetic array 328 is in contact with a ferrous material, a magnetic circuit is completed through that face and the ferrous material. The magnetic flux is then contained within the closed magnetic circuit. The other, open, operating face has very little, if any, magnetic field present at its pole faces. In FIG. 18, for example, with none of the electromagnets energized, the operating face containing pole faces 356 and 368 is in contact with the brake drum hub surface 324, and a magnetic circuit based on the magnetic field of the permanent magnet 348 is completed from the end 360 of the permanent magnet 348 through pole piece part 354, then through the brake drum hub 322, then through pole piece part 366, and returns to the permanent magnet 348 through its end 372. There is little or no magnetic field at pole face 352 or pole face 364.

The arrangement of permanent magnet or magnets and the electromagnet placements in the magnetic array 328 allows the magnetic field at its pole faces 352, 356, 364 and 368 to be manipulated. The device can be caused to neutralize, enhance or change polarity of the magnetic field at each pole face. The permanent magnet 348 makes the poles magnetic so that it is a biased magnetic device. The control of electrical current passing through the electromagnet windings manipulates the magnetic field of the magnetic array. As described above, it can be seen that the magnetic flux can be moved from one operating face to the other operating face, and that capability is that of a flux pump.

It is basic knowledge that when an electrical current is passed through a conductor a magnetic field is generated at 90° to the direction of the current flow. The old right hand rule, with the thumb pointing in the direction of the current flow and the fingers pointing in the direction of the magnetic field, applies. When the conductor is wound about an armature to form an electromagnet, the center axis of the windings, which is the location of the armature, forms a bipolar magnet, with the opposite ends being of different polarity. Since the EMA is a magnetically biased device, the pole pieces have a magnetic field in its unpowered as well as in its energized state. The total magnetic field is made up of a combination of the permanent magnet flux component and the electromagnets' flux components.

FIG. 19 is a diagram of a magnetic array such as array 328 of FIG. 18. It is therefore identified at its pertinent parts and points with the same reference characters as used in FIG. 18. Several different conditions will be described referring to FIG. 19.

For the initial explanation, the operation of the Magnetic pole piece electromagnets and the interaction of the permanent magnet are discussed without the effect of the electromagnet around the permanent magnet.

The magnetic field of the magnetic array operating face adjacent the magnetic backing plate can be reversed or neutralized by controlling the power (voltage and current) to the magnetic array electromagnets. If neutralized, the magnetic backing plate poles at 338 and 342 will attract the poles of the magnetic array, moving the EMA toward the magnetic backing plate. The electrical power also neutralized the magnetic field on the magnetic array operating face at the brake drum hub surface 324, allowing the magnetic array to release from the brake drum hub.

If additional electrical power is fed into the electromagnets to slightly reverse the magnetic fields on both magnetic array operating faces, the performance is enhanced. The magnetic array operating face at the brake drum hub surface 324 would repel against the residual magnetism created by the contact of the magnetic array operating face with the brake drum hub. The magnetic field polarities at the magnetic backing plate interface would be opposite and the two fields would attract each other, moving the EMA to engagement with the magnetic backing plate and releasing the brake mechanism.

Now consideration will be given to the interaction of all five of the electromagnets EM1–EM5 and the permanent magnet 348. When an electromagnet is wound around a permanent magnet, any magnetic field induced into the electromagnet will either enhance or degrade the resultant magnetic field in relation to the permanent magnet magnetic field. If a permanent magnet has a field strength of 1,000 gauss, and an electromagnet that is wound around the permanent magnet is powered to produce a field for 250 gauss, the net magnetic field seen at each of the poles will be either 750 gauss or 1,250 gauss, depending on the polarity of the electromagnet. If both the permanent magnet and the electromagnet had concurrent North and South polarities, the net magnetic field would be 1,250 gauss. If they were of opposite polarities, the net magnetic field would be 750 gauss.

Permanent magnets and electromagnets in such a configuration are defined as magnetic manipulators, with the magnetic sum of the field strengths depending upon the variable strength of the electromagnets. Winding an electromagnet around a permanent magnet allows the monostable EMA to function as a combination of a flux pump and a magnetic manipulator.

Example A: Assuming that the electromagnets are not energized and that the permanent magnet 348 has a field strength of 1,000 gauss (+1,000 at its North pole 360, and −1,000 at its South pole 372), the field strengths at certain points on FIG. 18 would be:

| Gauss | At points in FIG. 18 |
|---|---|
| +1,000 | 358 |
| −1000 | 370 |
| +500 | 352 and 356 |
| −500 | 364 and 368 |

Example B: If electrical power is then applied only to EM5, the electromagnet 390 wound around the permanent magnet 348, to obtain an opposing polarity of 250 gauss, the results would be:

| Gauss | At points in FIG. 18 |
|---|---|
| +750 | 358 |
| +375 | 352 and 356 |
| −750 | 370 |
| −375 | 364 and 368 |

Example C: If the same electrical power as is applied to EM5 is then also applied to each of the other electromagnets EM1 through EM4, the results would be:

| Gauss | At points in FIG. 18 |
|---|---|
| +750 | 358 |
| +175 (+375−250) | 352 |
| +625 (+375+250) | 356 |
| −750 | 370 |
| −625 (−375−250) | 368 |
| −375 | 364 |

Example D: If the power is then increased on EM5 to 350 gauss, the results would be:

| Gauss | At points in FIG. 18 |
|---|---|
| +575 (+250+325) | 356 |
| +650 | 358 |
| +75 (+325−250) | 352 |
| −575 (−325−250) | 368 |
| −650 | 370 |
| −325 | 364 |

Example E: If the power is then increased on the pole piece electromagnets EM1, EM2, EM3, and EM4 to produce 325 gauss, the results would be:

| Gauss | At points in FIG. 18 |
|---|---|
| +650 | 358 |
| +650 (+325+325) | 356 |
| 0 (+325−325) | 352 |
| −650 | 370 |
| −650 (−325−325) | 368 |
| 0 (−325+325) | 364 |

Example F: Now if the power on EM5 increases its magnetic flux to 450 gauss, with no other changes, the magnetic field strength distribution would be:

| Gauss | At points in FIG. 18 |
|---|---|
| +550 | 358 |
| +600 (+325+275) | 356 |
| −50 (−325+275) | 352 |
| −550 | 370 |
| −600 (−325−275) | 368 |
| +50 (+325−275) | 364 |

Any change in the magnetic field strength of the electromagnet EM5, which is on the permanent magnet 348, will result in the same change in the pole piece magnetic field summation. The magnetic fields at the pole pieces operating faces change by ½ of the field intensity change seen at the electromagnet EM5 wound around the permanent magnet 348.

Changing the magnetic field on EM5 will result in either degradation or enhancement of the magnetic fields at the poles of the operating faces. Therefore, the electromagnet EM5, wound around the permanent magnet 348, functions as a magnetic field manipulator.

Any change in the magnetic field intensity of the pole piece electromagnets EM1–EM4 will result in a shift in the relative intensity of the magnetic field at the operating faces. Therefore, the pole piece electromagnets function as flux pumps, shifting the magnetic fields toward one of the magnetic array operating faces and away from the other one.

Changing the winding configuration of the pole piece electromagnets results in completely different magnetic operation and characteristics if the electromagnets of the pole pieces are split, forming two electromagnets at each of the pole pieces so that each operating face has its own independent electromagnets. Thus, by changing the winding configuration, EM1 and EM2 become independent of each other, and EM3 and EM4 become independent of each other. This configuration is shown in FIG. 20, using the same reference characters as used in FIGS. 18 and 19.

Figure 21:
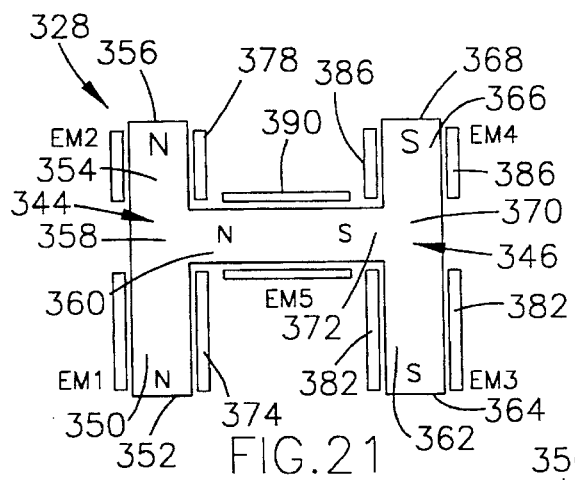
FIG. 21 is a diagrammatic representation similar to FIG. 20, with the pole piece parts of the magnetic array adjacent the brake drum hub surface being shorter than the pole piece parts of the magnetic array adjacent the magnetic backing plate.

If the magnetic structure is balanced by providing equal magnetic circuit paths, the magnetic field of the permanent magnet 348 is split equally between the two operating faces. If the magnetic circuit paths are not equal, the magnetic field of the permanent magnet 348 will not be equally divided between the two magnetic array operating faces. The magnetic field strengths on the operating faces of the magnetic array is in inverse relationship to the relative magnetic circuit path lengths from the source(s) of the magnetic field(s) to the operating faces. This configuration is shown in FIG. 21, using the same reference characters as used in FIGS. 18, 19 and 20. If there are different magnetic materials in the circuit paths having different permeability characteristics, a similar relationship also exists.

Example G: If the magnetic circuit paths have a length ration of 2:3, established by the pole piece parts 354 and 366 of FIGS. 18 and 19 being two units long and the pole piece parts 350 and 362 being three units long, and the magnetic field strength of the permanent magnet is 1,000 gauss, with all pole pieces having the same magnetic material permeability, the magnetic strength values at the selected points would be:

| Gauss | At points in FIG. 18 |
|---|---|
| +1,000 | 358 |
| +600 | 356 |
| +400 | 352 |
| −1,000 | 370 |
| −600 | 368 |
| −400 | 364 |

As can be readily seen, the shorter pole piece parts 354 and 366 provide less resistance to the magnetic field, and therefore respectively have +600 gauss and −600 gauss field strengths at their end faces 356 and 368 (which are in the operating face of the magnetic array facing the brake drum hub), and the longer pole piece parts 350 and 362 respectively have +400 gauss and −400 gauss field strengths at their end faces 352 and 364 (which are in the operating face of the magnetic array facing the magnetic backing plate).

Example H: If, in the arrangement of Example G, only the electromagnet EM5, surrounding the permanent magnet 328, is energized, to provide a 250 gauss field of opposite polarity to the permanent magnet, the following field strength values would be obtained:

| Gauss | At points in FIG. 18 |
|---|---|
| +750 | 358 |
| +450 | 356 |
| +300 | 352 |
| −750 | 370 |
| −450 | 368 |
| −300 | 364 |

Figure 22:
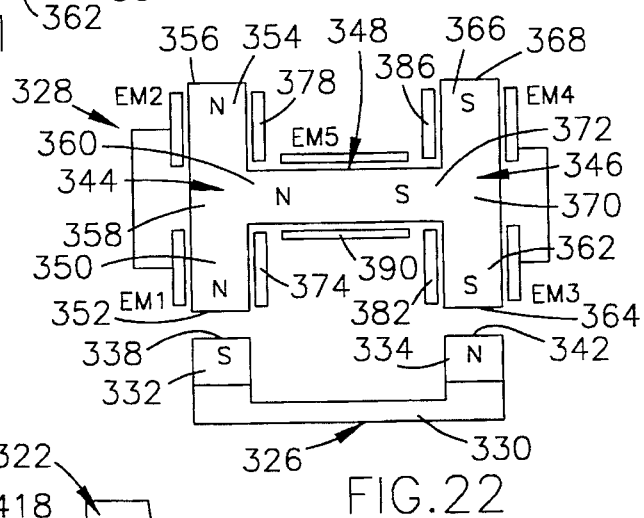
FIG. 22 shows the diagrammatic representation of FIG. 21 with the added diagrammatic showing of the magnetic backing plate assembly adjacent one operating face of the magnetic array.

Example I: If the magnetic backing plate is present and the electrical power is removed from all electromagnets of the magnetic array, as shown in FIG. 22 using the same reference characters as used in FIGS. 18, 19, 20 and 21, and the magnetic backing plate magnets provide magnetic field strengths of +400 gauss at face 338 and −400 gauss at face 342, the field strengths at the same points, plus the two points of the faces 338 and 342 of the magnetic backing permanent magnets, would be:

| Gauss | At points in FIG. 18 |
|---|---|
| +1,000 | 358 |
| +600 | 356 |
| +400 | 352 |
| −1,000 | 370 |
| −600 | 368 |
| −400 | 364 |
| +400 | 338 |
| −400 | 342 |

The magnetic fields of the magnetic array operating face (containing pole piece part faces 352 and 364) and the magnetic field of the magnetic backing plate faces 338 and 342 are of the same polarity, so they repel each other and force the magnetic array 328 to move away from the magnetic backing plate assembly 326. Since the magnetic fields of the operating face (which has pole piece part faces 356 and 368 in it) are active, they are attracted to the ferrous material brake drum hub surface and latch to that surface. With the vehicle moving, the brake drum hub is rotating, so the brakes are applied and slow down or stop the vehicle. If the vehicle is stationary, any minor movement of the brake drum hub in either rotational direction will mover the brake activation arm, applying the brake and preventing (or at least deterring) further vehicle wheel movement.

Example J: If the pole piece electromagnets EM1 through EM4 in the arrangement of Example I above are energized to a state where they produce a magnetic field intensity of 450 gauss in a magnetic bucking configuration (i.e., South-North to North-South polarity), and the permanent magnet's electromagnet EM5 is energized to produce a magnetic field of 250 gauss, the resulting magnetic field strengths at the various points will be:

| Gauss | At points in FIG. 18 |
|---|---|
| +750 | 360 |
| +450 | 358 |
| 0 | 356 |
| −150 | 352 |
| −750 | 372 |
| −450 | 370 |
| 0 | 368 |
| +150 | 364 |
| +400 | 338 |
| −400 | 342 |

The operating face of the magnetic array 328, containing pole piece part faces 352 and 364, and the operating face of the magnetic backing plate assembly 326, containing magnet faces 338 and 342, will magnetically attract each other. Since the magnetic field on the operating face of the magnetic array 328 facing the brake drum hub surface 324, containing pole piece part faces 356 and 368, has been neutralized, there is no magnetic force holding the magnetic array 328 to the brake drum hub. It is magnetically released, and the magnetic array 328 moves away from the brake drum hub surface 324 and engages the magnetic backing plate operating face containing the faces 338 and 342 of that plate's magnets 332 and 334. Thus, the brake is released with the electrical power applied.

In practice, the magnetic field on the brake drum hub operating face of the magnetic array does not have to be completely canceled. As it is decreased and the magnetic attraction between the magnetic array and the magnetic backing plate is increased, that magnetic attraction will have sufficient force to overcome the degenerating attraction to the brake drum hub surface, disengaging the magnetic array from that surface and causing the brake to be released as the magnetic array moves toward and engages the magnetic backing plate operating face. Modulation of these magnetic field attractions permits the braking effort obtained to be eased in a controlled manner.

When the brake system of the vehicle having the herein disclosed and claimed invention incorporated therein is actuated while the vehicle, or the towing and trailing vehicles of a tractor-trailer rig, is moving, and the brakes are applied, such brake application is said to be in the service braking mode. Such brake application is controlled by one of the brake control systems shown in FIGS. 30 and 31 by reducing the electrical power to the brake EMAs, resulting in brake application. The more service braking effort that is needed, the less electrical power is applied to the brake EMAs, causing the brakes to be applied with greater effort.

Figure 23:
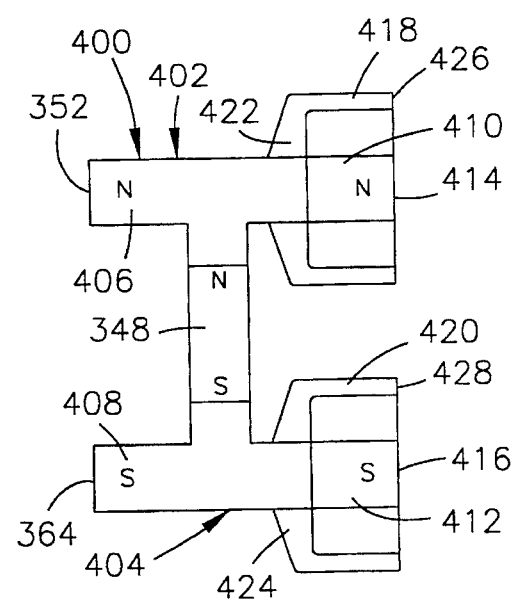
FIG. 23 is a simplified schematic representation of the magnets of an EMA in which the pole pieces extending toward the brake drum hub are provided with magnetic shields.

FIG. 23 is a schematic illustration of modified magnetic array 400 similar to that of FIGS. 18 and 22, in which the electromagnet windings are omitted for simplicity. The permanent magnet 348 is retained, but the pole pieces are modified. Pole pieces 402 and 404 are similar to pole pieces 344 and 346 in that the pole piece parts 406 and 408 extending toward the magnetic backing plate are the armatures of electromagnets EM1 and EM3. However, the pole piece parts 410 and 412, while also being electromagnet armatures respectively of electromagnets EM2 and EM4, are also permanent magnets. The end faces 414 and 416 which form the magnetic array operating face adjacent the brake drum hub are comparable to the end faces 356 and 368 of those earlier described drawings. Pole piece parts 410 and 412 respectively have magnetic shields 418 and 420 positioned about them. These shields are generally cup-shaped, being mounted at their bases 422 and 424 on their respective pole pieces near the permanent magnet junctions with the pole pieces and not on the permanent magnet pole pieces 410 and 412. They are radially spaced from the permanent magnet pole pieces 410 and 412, the annular spaces so provided having the electromagnet windings EM2 and EM4 (not shown in FIG. 23, but shown in FIG. 18, for example) in those locations. The outer open-cup ends 426 and 428 extend substantially to the magnetic array operating face adjacent the brake drum hub surface 324 (not here shown).

Shielding these permanent magnets/electromagnets, and particularly those near the brake drum hub, increases the magnetic efficiency of the magnetic array. However, their presence requires a precise magnetic balance to perform effectively.

Figure 24:
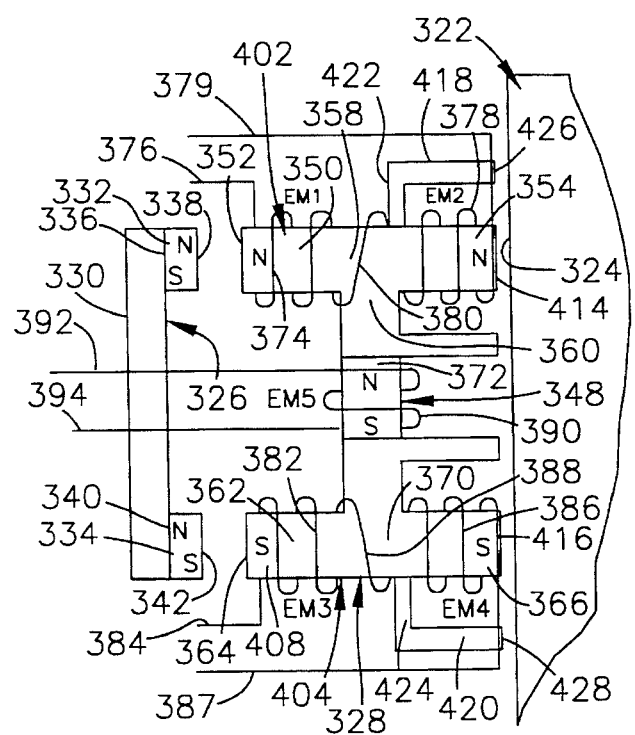
FIG. 24 is similar to the presentation shown in FIG. 18, with magnetic shields provided on the upper pole pieces (the ones extending toward the brake drum hub).

FIG. 24 is a schematic representation of an EMA similar to FIG. 18 but incorporating the structural concept of FIG. 23. The reference characters as used in FIGS. 18 and 23 are here used as appropriate. Electromagnet windings 374, 378, 382, 386 and 390, which are respectively electromagnets EM1, EM2, EM3, EM4 and EM5, are shown as well as their various electrical leads or connections 376, 379, 380, 384, 387, 388, 392 and 394. Likewise, the brake drum hub 322 with its surface 324 is shown, as is the magnetic backing plate 326 with its permanent magnets 332 and 334. The respective faces 338 and 342 of these permanent magnets are aligned with the faces 352 and 364 of pole piece parts 406 and 408. It is noted that although pole piece parts have been given separate reference numerals from the pole piece parts 350 and 362 of FIG. 18, they are actually the same as those pole parts and therefore the same pole part face reference numbers have been used.

In FIG. 24, the magnetic shields 418 and 420 are shown as being integral with the center parts 358 and 370 of the pole pieces 402 and 404. They may be so integrally made, or may be made separately as shown in FIG. 23 and secured to the pole pieces 402 and 404 as shown in that FIGURE. Magnetic shields of this FIGURE perform the same function as they do in FIG. 23.

Figure 25:
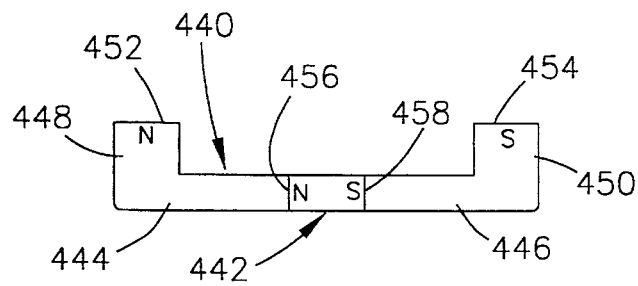
FIG. 25 is a schematic representation of a magnetic backing plate arm in which the body of the plate is a short, wide, U-shaped (in cross section) element with a single permanent magnet in the center part. The arm-like ends extending from the permanent magnet are made of magnetic-sensitive material which is not a permanent magnet. That material takes on the magnetic characteristics of the permanent magnet to which it is attached.

FIG. 25 schematically shows a single permanent magnet as the permanent magnet part of the magnetic backing plate assembly 440. That assembly comprises the center part which is a permanent magnet 442 and J-shaped arms 444 and 446 joined at one end of each to an end of magnet 442. The ends 448 and 450 of arms 444 and 446 remote from magnet 442 terminate in end surface faces 452 and 454 respectively. These faces are perpendicular to the opposed end faces 456 and 458 of permanent magnet 442. This arrangement allows a better magnetic strength match at the faces 452 and 454 than does a pair of magnets as shown in FIG. 26, since the arms 444 and 446 are of equal magnetic length and the magnetic source for their faces is a single magnet having the same magnetic strength (with opposite polarity) at each of its faces 456 and 458.

Figure 26:
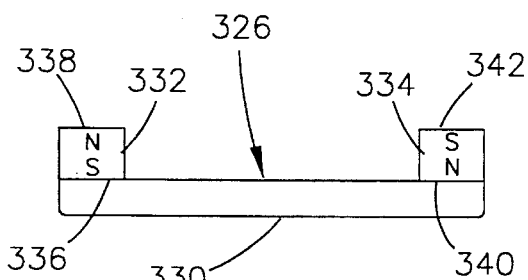
FIG. 26 is a schematic representation of a magnetic backing plate similar to that of FIG. 25 in which the magnetic-sensitive material extends throughout the bottom of the U-shaped plate and a permanent magnet is mounted on each end of that material and extends toward the EMA associated with the magnetic backing plate.

FIG. 26 schematically illustrates the type of magnetic assembly shown in FIGS. 18 and 24. Therefore the same reference characters for that assembly are used in describing this FIGURE. Magnetic backing plate assembly 326 includes a magnetic backing plate 330 which is made of a suitable magnetic-sensitive material which can easily transmit magnetic flux but is of itself not a permanent magnet. Permanent magnets 332 and 334 are secured to the plate 330 so as to be in magnetic and physical engagement alignment with the faces of two of the armatures of electromagnets of the magnetic array, as shown in FIG. 18, for example. Magnet 332 has its South magnetic pole 336 in contact with plate 330, and its North magnetic pole 338 in the face of the magnetic backing plate assembly which in turn faces a face of the magnetic array. Magnet 334 has its North magnetic pole 340 in contact with plate 330, and its South magnetic pole 342 in the face of the magnetic plate assembly which in turn faces a face of the magnetic array.

Figure 27:
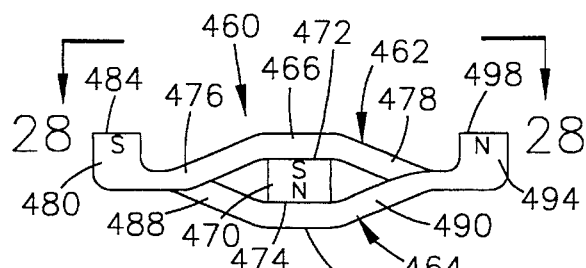
FIG. 27 is a schematic representation of a magnetic backing plate in which a magnetic matrix is provided, with two complete pole sets magnetically charged by a single permanent magnet, one magnetic pole of which engages one pole set and the other magnetic pole of which engages the other pole set.
Figure 28:
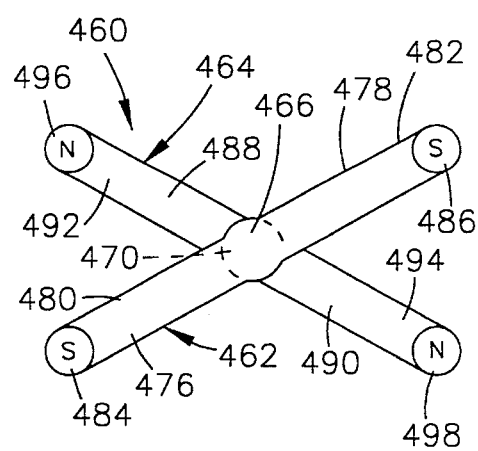
FIG. 28 is a plan view of the magnetic backing plate representation of FIG. 27, taken in the direction of arrows 28—28 of that FIGURE.

FIGS. 27 and 28 show an arrangement wherein the magnetic backing plate assembly 460 is a matrix which is designed to cooperate with a complementary magnetic array matrix such as that shown in FIG. 29, for example. The assembly 460 comprises two curved, double-J ended, arms 462 and 464 made of an appropriate magnetic-sensitive material. The arm 462 has a center section 466 and the arm 464 has a center section 468 which respectively engage opposite face ends 472 and 474 of a permanent magnet 470. End 472 is identified as having South polarity and end 474 is identified as having North polarity.

The sections 476 and 478 of arm 462 extending outwardly from its center section 466 curve downwardly as seen in the FIGURE and then turn upwardly to form their respective J-shaped outer ends 480 and 482. These outer ends respectively terminate in surface faces 484 and 486 which lie in a common plane which becomes the plane of the operating face of the assembly 460. J-shaped outer end 482 and surface face 486 are hidden in FIG. 27 but are shown in FIG. 28.

The outer sections 488 and 490 of arm 464 curve gently upwardly from the arm center section 468 in a reverse manner from the curving of arm 462 sections 476 and 478 and then turn sharply upwardly as seen in the FIGURE to form their respective J-shaped outer ends 492 and 494. These outer ends respectively terminate in surface faces 496 and 498 which lie in the same common plane as do faces 484 and 486, and therefore also are in the plane of the operating face of the assembly 460. J-shaped outer end 492 and surface face 496 are hidden in FIG. 27 but shown in FIG. 28.

While the schematic view in FIG. 28 is generally X-shaped with the arms not at 90° angles, but at approximately 65° lesser included angles, they can be positioned at any suitable angle required so that, for example, faces 484 and 496, and faces 486 and 498, can be immediately adjacent to each other or faces 486 and 496, and faces 484 and 498, can be immediately adjacent to each other; or, they can be positioned up to 90° lesser included angles.

This magnetic backing plate assembly 460, by using a single permanent magnet 470 and arms of equal length and size, assures magnetic balance among the four faces 484, 486, 496 and 498 which is not as easily obtainable if separate permanent magnets were used for either each of two pairs of faces or for all four faces. It is understood that this matrix arrangement can be expanded by making each of the arms 462 and 464 generally X-shaped as seen in FIG. 28, thus providing eight faces if a magnetic array matrix should have need of such a magnetic backing plate assembly. Furthermore, if a controlled magnetic unbalanced arrangement should be desired, it can be controlled by changing the areas of certain faces, or by changing the length of one or more arm sections in relation to others, as above explained. Such an application may be found in other mechanisms. However, in the brake field and most other fields of use, balance is needed. If the field strength at one face is greater than the field strength of another face in the assemblies of FIGS. 25 and 26, or in the matrix type assembly of FIGS. 27 and 28, the stronger field will overpower the weaker field and will possibly attract its aligned but opposed field rather than repelling it.

FIGS. 29 schematically shows the permanent magnets and the electromagnet armatures of a magnetic array matrix 500 that may be used with the magnetic backing plate of FIGS. 27 and 28. The general arrangement is that of four equally shaped and sized "H" figures, identified in the drawing as $H_1$, $H_2$, $H_3$, and $H_4$ and having arrows 502, 504, 506 and 508 respectively indicating the direction for viewing each "H" figure.

$H_1$ has a cross bar 510, pole pieces 512 and 514 forming the vertical sides of the "H" and connected at their midpoints (or otherwise if it is desired to have the upper parts and the lower parts of different lengths) to the cross bar 510, with the pole piece 512 having an upper part 516 and a lower part 518, and pole piece 514 having an upper part 520 and a lower part 522. Pole piece upper parts 516 and 520 respectively have end faces 524 and 526. Pole piece lower parts 518 and 522 have similar end faces, but they are hidden in this elevation view. Pole piece 512 has, at its connection point with the cross bar 510, slight extensions 528 and 528', extending therefrom in a common plane with the cross bar 510 and at a right angle relative to each other. Cross bar 510 is connected to extension 528. Pole piece 514 has, at its connection point with the cross bar 510, slight extensions 529 and 529', extending therefrom in a common plane with the cross bar 510 and at a right angle relative to each other. Cross bar 510 is connected to extension 529.

$H_2$ has a cross bar 530, pole pieces 532 and 534 forming the vertical sides of the "H" and connected at their midpoints (or otherwise if it is desired to have the upper parts and the lower parts of different lengths) to the cross bar 530, with the pole piece 532 having an upper part 536 and a lower part 538, and pole piece 534 having an upper part 540 and a lower part 542. Pole piece upper parts 536 and 540 respectively have end faces 544 and 546. Pole piece lower parts 538 and 542 have similar end faces, but they are hidden in this elevation view. Pole piece 532 has, at its connection point with the cross bar 530, slight extensions 548 and 548', extending therefrom in a common plane with the cross bar 530 and at a right angle relative to each other. Cross bar 530 is connected to extension 548. Pole piece 534 has, at its connection point with the cross bar 530, slight extensions 549 and 549', extending therefrom in a common plane with the cross bar 530 and at a right angle relative to each other. Cross bar 530 is connected to extension 549.

$H_3$ is made up of pole piece 512 of $H_1$ and pole piece 532 of $H_2$, together with cross bar 550, which is connected to pole piece 512 at extension 528' and to pole piece 532 at extension 548'.

$H_4$ is made up of pole piece 514 of $H_1$ and pole piece 534 of $H_2$, together with cross bar 552, which is connected to pole piece 514 at extension 529' and to pole piece 534 at extension 549'.

Thus one operating face, for example the one to be facing the brake drum surface 324 (see FIG. 18, for example), has faces 524, 526, 544 and 546 in its common plane. The other operating face, for example the one to be facing the magnetic backing plate of FIGS. 27 and 28, has the lower faces, not shown, of the pole piece lower parts 518, 522, 538 and 542 in its common plane. The various cross bars are preferably permanent magnets, and the various upper and lower piece parts may be either armatures of electromagnets but not permanent magnets or both armatures of electromagnets and permanent magnets, or a suitable combination depending on the particular needs of the control system. The cross bars, or any of them, may also be armatures of electromagnets. While simple single "H" magnetic arrays will handle the required braking of many vehicles, larger, heavy ones such as commercial trucks and trailers may at times require higher strength magnetic arrays. In such cases, the matrix forms of the magnetic array and the magnetic backing plate may be advantageously employed.

Figure 30:
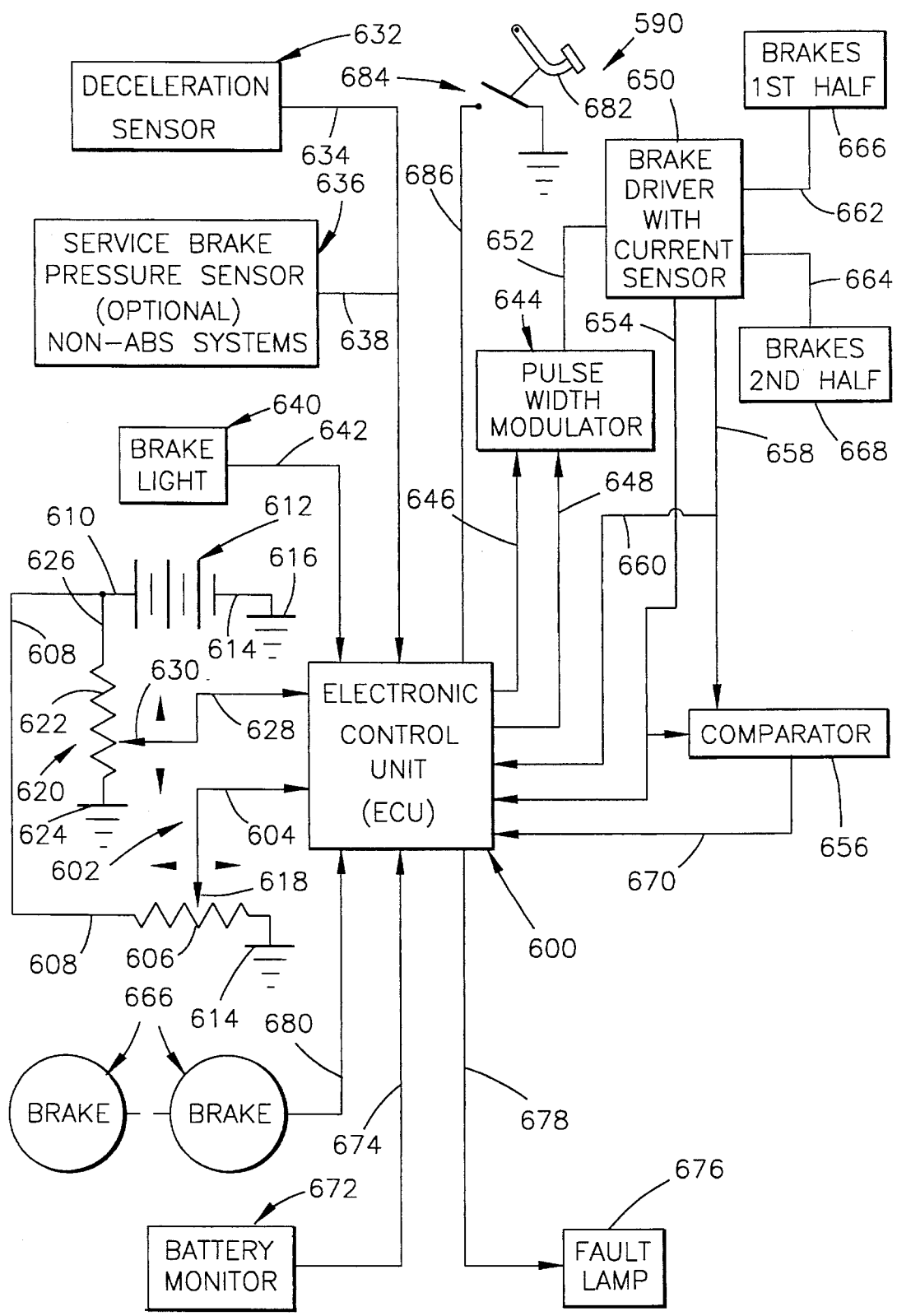
FIG. 30 is a schematic electrical diagram showing the control system embodying the invention herein disclosed and claimed, this diagram being applicable when there is not a security or anti-theft feature incorporated.
Figure 31:
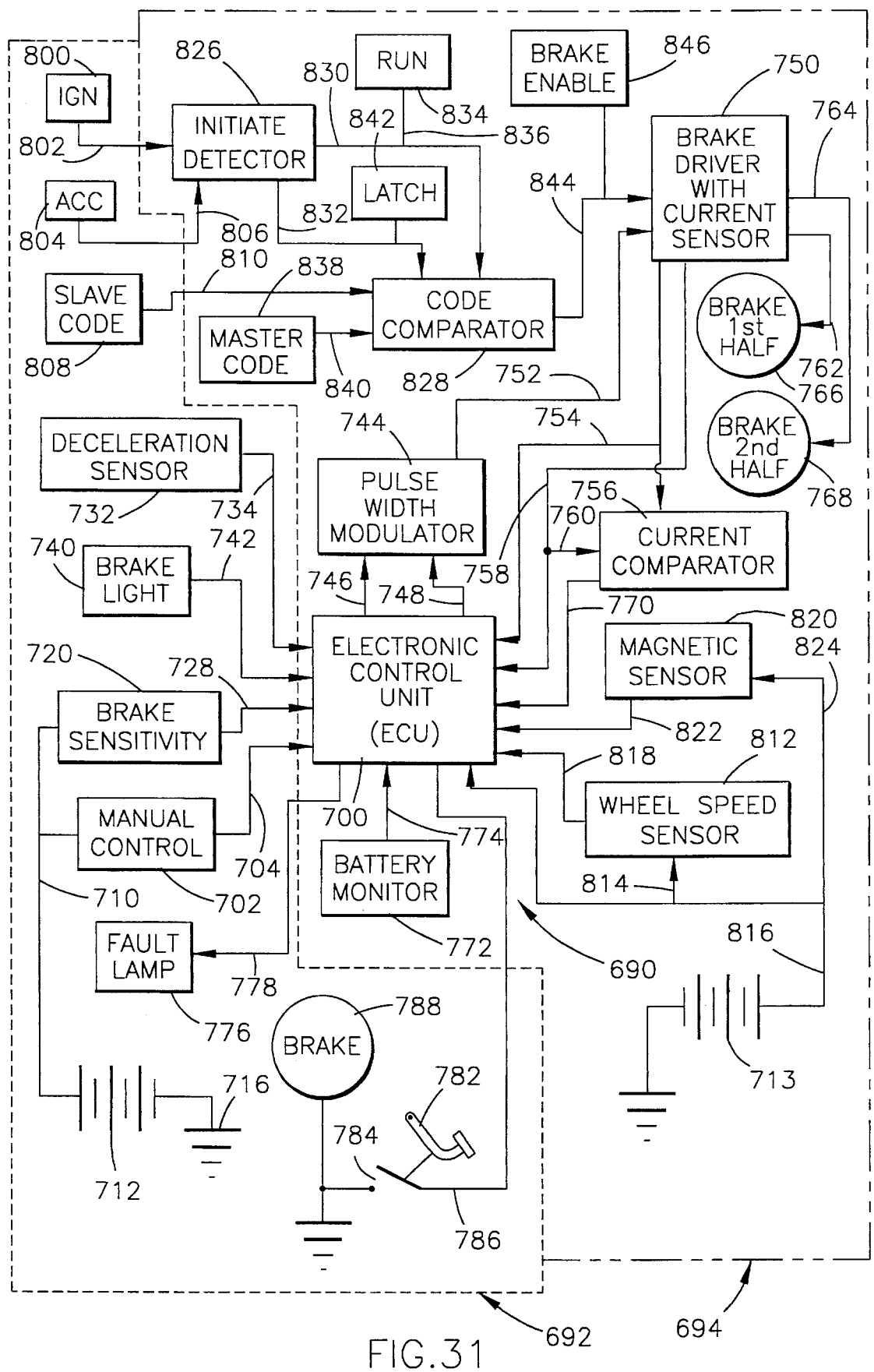
FIG. 31 is a similar schematic electrical diagram showing the control system embodying the invention herein disclosed and claimed, and incorporating the security or anti-theft feature which prevents the parked trailer brake system from being released unless the trailer is connected to a tow vehicle having the proper code for permitting the release of the trailer brake system from its parking brake mode.

FIG. 30 is a schematic electrical and component drawing of the control system used with the disclosed brakes and electrically controlled brake elements when there is no security code required. FIG. 31 is a similar schematic and electrical and component drawing of the control system when there is a security code provision preventing the parked brakes from being released unless a specific code is entered into the control system. For tractor-trailer systems, the master system is on the trailer, and the brake release code in that system must be matched by a brake release code in the tractor after the tractor is connected to the trailer, including connection of the brake control system.

Both the controller systems control the brakes in a backward mode like air brake systems are usually configured. That is, the air pressure holds off the brake actuator when the vehicle wheels are to be allowed to roll. The brake actuator is power biased to keep the brakes engaged. Typically in air brake systems, this is done by brake actuator apply springs with air pressure servos that counteract the springs commensurate with the desired braking effort, including brake release, to the extent of the capability of the brake system. In the arrangement herein disclosed, the brakes are kept applied by permanent magnets that hold each EMA in its only stable condition, wherein it is magnetically latched to its associated brake drum hub so that the brakes are in the applied mode. Only by applying electrical power to the EMA electromagnets in the wheel brakes is the magnetism of the magnetic array of each EMA manipulated to begin reducing the brake applied force at each brake, and, if desired, the full release of the brakes. Much like the air pressure systems, the electrical power to the brake EMAs is decreased for increased braking actuation.

In the secure system of FIG. 31, the system contains a unique code, for example a specific serial number of suitable desired complexity, a settable number module, a comparator and a brake driver modifier for a brake-release enabling signal. The secure system is a split system consisting of a master unit on the trailer and a slave unit on the tractor that is to connect to and move the trailer. The master unit includes the modules more specifically described below, and may be located anywhere in the trailer, including in a wheel brake assembly if desired. The slave unit contains the interface modules more particularly described below, and is suitably located in the tractor vehicle. If the tractor is expected to be able to connect to and move various trailers having a master system, the slave unit may be able to select the security code for each such trailer. This can be done manually, or the system can do this automatically, so long as the appropriate trailer master system code has been entered into the slave unit. In the secure system, it is desirable to have tandem axle trailer brakes connected as shown in FIG. 17 of the drawings.

FIG. 30 shows a diagram of a brake control system 590 embodying the invention, this system having no security provision. The system 590 has an Electronic Control Unit (ECU) 600 which receives data from various sensors including a Manual Brake Control 602 which is controlled by the operator of the vehicle having the brake system and components herein disclosed and embodying the invention. Manual Brake Control 602 sends an electrical signal via electrical lead 604 to the ECU 600. Manual Brake Control 602 is shown as a variable resistance 606 in an electrical lead 608 connected at one end via electrical lead 610 to a source of electrical power schematically shown as a Battery 612, and connected to its other end to ground at 614. The Battery 612 is connected to ground at 616. The part 618 of the Manual Brake Control 602 engages the variable resistance 606 and its position of contact with that resistance, with the range of movement indicated by arrows, determines the characteristic of the signal sent to the ECU. Thus it can be said that the Manual Brake Control senses the vehicle operator's desired braking force, and the system 590 is designed to deliver that force within the limits of the equipment. Other types of manual controls may be used to generate other types of signals that one based on variations in voltage or current. For example, the signal generated may be frequency modulated, amplitude modulated, or timed pulses. It may be changed so as to be transmitted by fiber optics and then converted in the ECU to an electrical signal. These possibilities concerning all of the signal-generating elements of the system 590 as well as the system 690 of FIG. 31 are applicable.

The system 590 has a Sensitivity Control 620 constructed in a similar manner to the Manual Brake Control 602. Its variable resistance 622 is connected at one end 624 to ground and at the other end 626 to electrical lead 610, thence to the Battery 612 for power. The sensitivity signal is sent to the ECU through electrical lead 628, connected to the positionally controlled contact 630 with the variable resistance 622. The sensitivity of the Manual Brake Control 602 and therefore of the brake system can be varied by the Sensitivity Control 620.

The system 590 has a Deceleration Sensor 632 which generates signals reflecting the vehicle deceleration and sends them to the ECU via electrical lead 634. It also has a Service Brake Pressure Sensor 636 when the system 590 is on a vehicle (and particularly when the system 590 is on a trailer being towed by the towing vehicle) having no ABS system. If included, it generates pressure signals reflecting the brake actuating pressure in air or hydraulic braking systems on the tractor vehicle, and sends such signals to the ECU 600 by its connection 638 to electrical lead 634 so that the ECU of the trailer braking system 590 employing the invention herein disclosed and claimed can consider the braking effort demands being sent to the tractor vehicle by its operator. While not shown in this FIGURE, appropriate sensors including trailer wheel slip, trailer loaded weight, and other related factors can send their information to the ECU and it can process that information to control the braking effort actually obtained at the trailer wheel brakes so as to function as an ABS system for the trailer.

"ABS" means an anti-skid, wheel lock control, or anti-block braking system. They are now very common, particularly on passenger cars, light trucks, and some heavy duty tractor-trailer rigs. The basic objective of an ABS system is to prevent one or more vehicle wheels from rolling at such a lesser speed than that of the vehicle that braking effort between the vehicle tire and the ground is substantially lessened. Since as a general rule, when a vehicle tire/wheel is at about 20% wheel slip (meaning it is rolling at about 80% of the free-rolling speed it would have if it were rolling at the speed of the vehicle) it has the greatest effective braking action between the tire tread and the road surface. Any substantial increase in wheel slip results in considerably less braking effort, and, again as a general rule, when there is 100% wheel slip and the wheel is skidding on the road surface, there is the least braking effort being generated. Also, while steering wheels skid, steering direction cannot be exercised. This is true whether they are the driving wheels or not. When the rear wheels skid, lateral control of the rear end of the vehicle is lost, and it tends to move left or right, often ending in a spinout. ABS systems modulate the actual brake apply force delivered to the vehicle brakes on a computerized control basis so as to prevent excess wheel slip or skidding, even though the vehicle driver is demanding sufficient braking effort to cause such excess wheel slip or skidding.

The system 590 also has a Brake Light Sensor 640, which actually senses whether or not the brake manual control has been applied to initiate braking, and this sensing is done by determining whether or not the brake light circuit has been energized. The signal indicating that the brake light circuit has been energized is sent to the ECU 600 via electrical lead 642.

A Pulse Width Modulator 644 receives signals from the ECU 600 via electrical lead 646 and other signals, also from the ECU 600, via electrical lead 648. The Pulse Width Modulator 644 processes the information obtained from the ECU and sends signals to the Brake Driver With Current Sensor 650 via electrical lead 652.

The Brake Driver With Current Sensor 650 sends signals back to the ECU directly via electrical lead 654 and also to the Comparator 656. It sends other signals directly to the Comparator via electrical lead 658 and by electrical lead 660 connected to electrical lead 658, to the ECU 600. The Brake Driver With Current Sensor 650 also sends brake actuating power signals through electrical leads 662 and 664 to each Brake Circuit 666 and 668 in the split circuit brake system of FIG. 17.

Comparator 656 also generates signals which are transmitted to the ECU 600 via electrical lead 670. The ECU also receives signals from a Battery Monitor 672 via electrical lead 674, and sends a signal to a Fault Lamp 676 via electrical lead 678, indicating a fault in the system 590 when such a detectable fault occurs. This lamp is available for the vehicle operator to readily see, so that he immediately knows that something is wrong with his brake system. The ECU 600 is also connected to the brakes of each brake circuit 666 and 668 so as to receive information from them as to whether the EMA has actually latched onto the brake drum hub surface. The connection between the ECU and one of the brake circuits 666 is shown as electrical lead 680.

A manual brake apply for parking brake purposes may be obtained when the operator moves the Parking Brake Pedal 682 to close Switch 684 and deliver the signal through electrical lead 686 indicating that the brake system should be shifted to the parking brake mode. When this occurs, all electrical power signals through electrical leads 662 and 664 to the vehicle brakes will be stopped, and the brakes will default to the actuated brake condition with the EMAs being latched to the brake drum hub surfaces by permanent magnet field forces alone. Also, the Switch 684 may be closed manually by other means such as a button or lever to be used when the trailer brakes are to be quickly applied independently of the system controls. This is particularly advantageous when the trailer begins to sway. A quick touch of the trailer brakes will straighten the trailer out so that the sway is decreased or eliminated rather than building up dangerously until control of the tractor-trailer rig is lost. This arrangement may be applied to the switch 784 of FIG. 31 just as well.

FIG. 31 shows a diagram of a brake control system 690 embodying the invention and including a security provision. This system has several major components that are comparable or even identical to major components of the system 590 of FIG. 30. Therefore, the reference characters used in describing major components of FIG. 31 are in many instances easily compared to the reference characters used in describing major components of FIG. 30, being numerically only one hundred greater. System 690 is divided into two major parts, a slave module 692 which is installed on the tractor or towing vehicle and a master module 694 which is installed on the trailer to be towed by the vehicle having the slave module installed therein. The description will assume that the master module 694 and the slave module 692 are connected as shown in the diagram. Obviously, when the tractor and the trailer are not connected the connection is broken at the dashed line of the diagram showing separation of the slave and master modules 692 and 694.

The master module 694 of system 690 has an Electronic Control Unit (ECU) 700 which receives data from various sensors in the slave module 692, including a Manual Brake Control 702 which is controlled by the operator of the vehicle having the brake system slave module 692 installed therein. Manual Brake Control 702 sends an electrical signal via electrical lead 704 to the ECU 700. Manual Brake Control 702 may be of the same type as Manual Brake Control 602, and is therefore not again shown in detail. It is connected via electrical lead 710 to a source of electrical power in the tractor or towing vehicle and schematically shown as a Battery 712. The Battery 712 is connected to ground at 716. The Manual Brake Control 702 senses the vehicle operator's desired braking force, and the system 690 is designed to deliver that force within the limits of the equipment.

The slave module 692 of system 690 has a Brake Sensitivity Control 720 constructed in a similar manner to the Sensitivity Control 620 and the Manual Brake Control 602 of FIG. 30. Therefore, the details of such construction are not again shown and described. It is connected at one end to electrical lead 710, thence to the Battery 712 for power. The sensitivity signal is sent to the ECU through electrical lead 728. The sensitivity of the Manual Brake Control 702 and therefore of the brake circuits 766 and 768 can be varied by the Sensitivity Control 720.

The Sensitivity Controls 620 of FIG. 30 and 720 of FIG. 31 are used to compensate for trailer weight. When the trailer weight is increased, the brake system sensitivity is increased, allowing the brakes of the trailer to become more effective. With a lighter, or even empty, trailer the sensitivity is decreased, permitting the trailer brakes to become less effective so that they are not so likely to cause a skid by overapplication. Of course, when an ABS function is active, this is considerably simplified and such a condition is much less likely to occur than it would if there were no sensitivity control. The Sensitivity Controls 620 and 720 may be connected to vehicle weight sensors at the points of trailer weight support so that they are automatically adjusted for changes in trailer weight.

The slave module 692 of system 690 has a Deceleration Sensor 732 which generates signals reflecting the deceleration of the tractor vehicle as it decelerates while braking, and sends them to the ECU via electrical lead 734. While not shown in FIG. 31, it may also have a Service Brake Pressure Sensor of the type of Sensor 632 provided in system 590 of FIG. 30. Such a Sensor as Sensor 632 would be used in system 690 only when the system is on a vehicle tractor-trailer rig having no separate ABS system. If included, it would generates pressure signals reflecting the brake actuating pressure in air or hydraulic braking systems on the tractor vehicle, and sends such signals to the ECU 700 so that that ECU can consider the braking effort demands, including their presence or absence, being sent to the tractor vehicle by its operator. Both the Deceleration Sensor 632 in FIG. 30 and 732 in FIG. 31 and the Brake Pressure Sensor 636 of FIG. 30 (as well as one in FIG. 31 if it is added to the system 694) determine the amount of tractor vehicle braking when the service brakes of the tractor vehicle are functioning to brake that vehicle. Because the tractor vehicle, while braking, is also slowing down the trailer that it is towing, these sensors also are sensing the effects of braking of the trailer vehicle. These sensors, together with the Brake Lamp Sensor 640 or 740, indicate to the ECU that the tractor vehicle brakes are energized and braking action is in fact occurring. With that information received, the ECU sends a signal to the Pulse Width Modulator 644 or 744, which in turn causes the brake drivers in Brake Driver With Current Sensor 650 or 750 to reduce the electrical power to the EMAs of the brakes in brake circuits 666, 668 or 766, 768, initiating braking action on the trailer wheels.

While not shown in this FIGURE, appropriate sensors including trailer wheel slip, trailer loaded weight, and other related factors can send their information to the ECU 700 and it can process that information to control the braking effort actually obtained at the trailer wheel brakes of brake circuits 766 and 768 so as to function as an ABS system for the trailer having a master module 694 installed.

System 690 also has a Brake Light Sensor 740, which actually senses whether or not the Brake Manual Control 702 has been applied to initiate braking, and this sensing is done by determining whether or not the brake light circuit of the tractor vehicle having the slave module 692 installed has been energized. The signal indicating that the brake light circuit has been energized is sent to the ECU 700 via electrical lead 742.

A Pulse Width Modulator 744 in the Master Module 694 receives signals from the ECU 700 via electrical lead 746 and other signals, also from the ECU 700, via electrical lead 748. The Pulse Width Modulator 744 processes the information obtained from the ECU and sends signals to the Brake Driver With Current Sensor 750, also in the Master Module 694, via electrical lead 752.

The Brake Driver With Current Sensor 750 sends signals back to the ECU directly via electrical lead 754 and also to the Current Comparator 756. It sends other signals directly to the Comparator via electrical lead 758 and electrical lead 760 connected to electrical lead 758. Lead 758 is also so connected that other signals from the Brake Driver With Current Sensor 750 are sent directly through it to the ECU 700. The Brake Driver With Current Sensor 750 also sends brake actuating power signals through electrical leads 762 and 764 to each Brake Circuit 766 and 768 in the split circuit system of FIG. 17.

Current Comparator 756 also generates signals which are transmitted to the ECU 700 via electrical lead 770. The ECU also receives signals from a Battery Monitor 772 via electrical lead 774, and sends a signal to a Fault Lamp 776, located in the slave module 692, via electrical lead 778, indicating a fault in the system 690 when such a detectable fault occurs. This lamp is available for the tractor vehicle operator to readily see, so that he immediately knows that something is wrong with his brake system. The ECU 700 may also be connected to the brakes of each brake circuit 766 and 768 so as to receive information from them as to whether the EMA has actually latched onto the brake drum hub surface, as shown in FIG. 30 but not further shown in FIG. 31.

A manual brake apply for parking brake purposes may be obtained when the operator moves the Parking Brake Pedal 782 to apply the tractor vehicle parking brakes 788, at the same time acting to close Switch 784 and deliver the signal to the ECU 700 through electrical lead 786 indicating that the brake system 690 should be shifted to the parking brake mode. When this occurs, the ECU 700 cuts off all electrical power signals through electrical leads 762 and 764 to the vehicle brakes, and the brakes will default to the actuated brake condition with the EMAs being latched to the brake drum hub surfaces by permanent magnet field forces alone.

The description of FIG. 31 to this point deals with the similarities of it with FIG. 30. The differences, which are added units of each of the Modules 692 and 694, will now be described. In the Slave Module 692, the Ignition Key Switch 800, labeled "IGN" on the schematic diagram, is connected to the Master Module 694 through electrical lead 802. Similarly, a signal reporting the activation of one or more of certain accessories, particularly including an engine start-up time delay sensor and schematically considered to be in the diagram box 804 labeled "ACC" in the drawing, is also delivered, via electrical lead 806, to the Master Module 694. Also in the Slave Module 692 is a Slave Code Unit 808 connected via electrical lead 810 to the Master Module 694. Unit 808 has a serial number code electronically imbedded for each trailer that the tractor is expected to be able to hitch up to and move. There may therefore be only one such code in it, or there may be many such codes. Unit 808 is programmable to be able to add and delete such codes, preferably within a secure area by only properly authorized persons. One of these codes is used by the Master Module 694 to determine that the particular tractor vehicle is actually authorized to move the trailer in which the Master Module 694 is installed. This will be further described below.

The Master Module 694 has several units not shown in the system 590 of FIG. 30. These include a Wheel Speed Sensor 812 which senses the wheel speed of at least one of the trailer wheels and generates output signals accordingly. It is connected via electrical leads 814 and 816 to receive electrical power from a power source such as trailer Battery 713. Note that electrical lead 816 also supplies electrical power to the ECU 700. Wheel Speed Sensor 812 sends its output signals to the ECU 700 via electrical lead 818. Magnetic Sensors 820 are embedded in one or more of the EMAs and sense the presence of electromagnetically-induced magnetic fields to confirm that they do in fact occur so as to release the brake or brakes in which they are installed. Thus they sense the electromagnetic activation of EMAs at one or more trailer wheel brakes and send their signals generated accordingly to the ECU 700 via various electrical leads 822. They receive electrical power via various electrical leads 824 connected to electrical lead 816 from Battery 713.

The Master Module 694 has an Initiate Detector 826 which receives the signals from the Ignition Key Switch 800 via electrical lead 802, and the signals from the ACC 804, and particularly the engine start-up delay signal, via electrical lead 806.

A Code Comparator 828 in the Master Module 694 receives various signals from the Initiate Detector 826 via electrical leads 830 and 832. Once the tractor vehicle engine has been started and its transmission shifted to a drive gear, the Initiate Detector output signal "RUN" becomes active after a short time delay, such as about 3 seconds. This "RUN" signal is indicated by box 834, which is connected to electrical lead 830 by electrical lead 836. When the "RUN" signal becomes active, the code or codes set into the Slave Code Unit 808 are compared, by the Code Comparator 828, to the code in a Master Code Unit 838 in the Master Module 694. The Master Code Unit is connected to the Code Comparator via electrical lead 840. Meanwhile, a Latch Signal Unit 842, sensing the signal in electrical lead 832 from the Initiate Detector 826 to the Code Comparator 828, creates a short time-delayed latch signal which is also transmitted to the Code Comparator 828 via electrical lead 832. If a code in the Slave Code Unit 808 matches the code in the Master Code Unit 838 by the time the latch signal becomes active, a signal from the Code Comparator 828 via an electrical lead 844 generates a "brake enable" signal received by the Enable Unit 846 connected to lead 844, and an output "brake enable" signal is delivered from Enable Unit 846 to the Brake Driver With Current Sensor 750. However, if a code in the Slave Code Unit 808 does not match the code in the Master Code Unit 838 by the time the latch signal becomes active (effectively determining that the tractor Slave Module 692 connected to the trailer Master Module 694 is not authorized to move the trailer), the Brake Enable Unit is latched inactive. It does not forward a "brake enable" signal to the Brake Driver With Current Sensor 750, which means that a "brake disable" signal is received by the brake drivers in the Brake Driver With Current Sensor and those brake drivers are disabled. This prevents any electrical power from being delivered to any of the electromagnets within any of the EMAs of the various wheel brakes in the disabled brake circuits 766 and 768. Thus, the magnetic field of the permanent magnet(s) in the EMAs cannot be neutralized to release the brakes.

If the slave code and the master code match, the Pulse Width Modulator 744 starts running during the power-up delay. Once the brake drivers are enabled, electrical power is applied to the electromagnets within the various EMAs, neutralizing or even reversing the permanent magnet fields which were holding the brakes in the applied, parked, position. With the brakes then released, the trailer containing the Master Module 694 can be moved.

The Brake Driver With Current Sensor 750, as well as the same unit 650 in FIG. 30, senses and provides information on the electrical current being drawn by the electromagnets at the brakes in each of the brake circuits 766 and 768 in this FIGURE, and 666 and 668 in FIG. 30. Thus current lines 754 and 758 in this FIG. 31, and 654 and 658/660 in FIG.

30, provide this current information to the ECU 700 and the Current Comparator 756 in this FIG. 31, and to the ECU 600 and the Current Comparator 656 in FIG. 30. If there is a current imbalance over a predetermined amount, the Comparator 656 of FIG. 30 or the Current Comparator 756 of FIG. 31 will generate a fault signal and the Fault Lamp 676 or 776 will be energized. There may be two Fault Lamps in either system 590 or 690, one for each brake circuit 666 and 668 in FIG. 30, and one for each brake circuit 766 and 768 in FIG. 31.

The Battery Monitors 672 of FIG. 30 and 772 of FIG. 31 operate much like a digital device trigger which has some degree of hysteresis, coming on at one voltage (e.g., 1.3 V) and off at another (e.g., 1.1 V), preventing chatter of the signal. They monitor the battery voltage in the event of a problem with the electrical system. If the battery voltage drops below a threshold voltage required to keep the brakes released, a fault signal will be generated and will cause the Fault Lamp 676 of FIG. 30 or 776 of FIG. 31 to be energized and alert the vehicle operator of the occurrence of a fault.

In either system 590 or 690, the ECU 600 or 700 varies the signal to the Pulse Width Modulator 644 or 744, allowing the two brake drivers in Brake Driver With Current Sensor 650 or 750 to provide a small constant electrical current to the electromagnets of the various EMAs during stand-by operating modes in which the brakes are not released. This is important because of the wide range of temperatures under which the brakes are to operate. This small current is controlled so as to allow a constant magnetic field as the electromagnet winding temperatures change. A secondary system in the ECU compensates for the changes in magnetic field that will occur with the changing of the temperatures of the various magnets.

I claim:

1. A magnetic latch mechanism having only one stable latched condition and comprising:

a first member, a fixed member having said first member operatively mounted thereon in arcuate pivotal relation relative to said fixed member, a magnetically-sensitive movable member movable relative to said first member and to said fixed member, and a magnetic array operatively forming a part of said first member, said magnetic array having at least one permanent magnet and at least one electromagnet;

said one stable latched condition of said mechanism having said magnetic array magnetically latched to said movable member by the magnetic flux of said at least one permanent magnet;

and control means for selectively and controllably modulating the electrical energization of said at least one electromagnet throughout a range of energization and polarity which generates magnetic fluxes in opposition to the magnetic flux of said at least one permanent magnet in which said magnetic flux of said at least one permanent magnet is selectively degraded, neutralized and overpowered, selectively degrading, neutralizing and overpowering the magnetic flux of said at least one permanent magnet exerted between said magnetic array and said movable member and urging said mechanism to said one stable condition.

2. The magnetic latch mechanism of claim 1 in which said fixed member is a vehicle drum brake backing plate of a vehicle wheel brake, said first member is a brake activation arm having one end operatively mounted to pivot in relation to said drum brake backing plate, said magnetically-sensitive movable member is the brake drum of the vehicle wheel brake having a brake hub and a brake-shoe-engageable friction surface, said vehicle wheel brake further including first and second brake shoe assemblies mounted on said drum brake backing plate for limited sliding and arcuate movements relative thereto as the wheel brake is actuated to engage said brake linings with said brake drum brake-shoe-engageable friction surfaces, each of said brake shoe assemblies having a shoe web and a brake lining, an anchor pin secured to said drum braking backing plate and having the adjacent ends of said shoe webs engaging said anchor pin under the retracting force influence of brake shoe retracting springs, said drum brake drum hub and brake-shoe-engageable friction surface substantially enclosing said brake shoe assemblies and said brake activation arm and having an annular disk-like surface on said brake drum hub substantially parallel to but axially spaced from said drum brake backing plate, said brake activation arm other end being a free end positioned near the other ends of said brake shoe assemblies from said anchor pin and an arm body between said arm ends positioned adjacent one of said brake shoe webs, said brake activation arm one end having means operatively engageable with said brake shoe webs which, when said arm is moved arcuately in either direction from a neutral position said brake shoes are moved to expand outwardly against the force of said shoe retracting springs and engage said drum brake-shoe-engageable friction surface in vehicle wheel braking relation, said brake shoes returning to their retracted position upon brake release with said brake activation arm then also returning to its neutral position relative to said brake shoes and said drum brake backing plate, and a magnetic assembly forming a part of said first member and being pivotally mounted on said brake activation arm free end so as to be movable toward and away from said brake drum hub disk-like surface while being pivotable in the plane of one face of said brake activation arm free end, said magnetic assembly having a magnetic backing plate having at least one permanent magnet and a plate body made of magnetic-sensitive material, said magnetic array forming a part of said magnetic assembly and movable toward and away from said magnetic backing plate and having a first operating face facing said brake drum hub disk-like surface and a second operating face facing said magnetic backing plate of said magnetic assembly, said operating faces having magnetic poles therein with magnetic pole faces being in the plane of one or the other of said operating faces, said magnetic array in said latch mechanism one stable latched condition having its first operating face engaging and being magnetically latched to said brake drum hub annular surface so that any arcuate rotational movement of that annular surface drags said magnetic assembly with it and pivots said brake activation arm to cause said brake shoes to engage their drum friction surface and obtain wheel brake braking, said magnetic assembly having guide means in and cooperating with guide slots formed in said brake activation arm free end to maintain said magnetic assembly in substantially the same arcuate alignment along a radius of said brake drum hub annular surface throughout its arcuate movements as a part of said brake activation arm free end.

3. The mechanism of claim 2 in which when said magnetic flux of said at least one permanent magnet is overpowered by magnetic flux of said at least one electromagnet said magnetic array is moved away from said brake drum hub disk-like surface and into magnetic engagement with said magnetic backing plate assembly and is held there by the magnetic flux of said at least one electrically energized electromagnet only so long as that magnetic flux is sufficiently stronger than said at least one permanent magnet magnetic flux to at least neutralize said at least one permanent magnet magnetic flux.

4. The mechanism of claim 2 in which said slots in said brake activation arm free end are oppositely arcuate stepped slots and a stepped pivot hole is positioned at the center of the circle on which said arcuate stepped slots are formed, a rotatable stepped pivot fastener unit is received through said stepped pivot hole and secured to said magnetic backing plate of said magnetic assembly for pivotal mounting of said magnetic assembly, and first and second stepped cylindrical guides are secured to said magnetic backing plate and respectively extend through and mate with said stepped arcuate slots, said guides permitting said rotation of said magnetic assembly as aforesaid and limiting the amount of such rotation in either direction from the neutral position.

5. A mono-stable magnetic latch mechanism having a stable latched first condition, an unstable and magnetic flux-forced unlatched second condition and a modulatable range of operation between said first and second conditions and including said second condition, said mechanism comprising:

a first member, a fixed member, a movable member movable relative to said fixed member and said first member, and a magnetic array forming a part of said first member;

said magnetic array having at least one permanent magnet and at least one electromagnet which is normally electromagnetically deenergized, the magnetic flux only of said at least one permanent magnet holding said magnetic array in said stable latched condition wherein said magnetic array is magnetically latched with said movable member;

and control means for said magnetic array selectively controlling the energization of said at least one electromagnet to a predetermined magnetic flux level from its normally deenergized state in modulated stages, said control means having manipulatable magnetic flux strength-and-polarity-controlling characteristics selectively moving said magnetic array into and within said range of operation between said first and second conditions by controlling the amount and polarity of energization of said at least one electromagnet to selectively degrade, neutralize or overpower the magnetic flux of said at least one permanent magnet and thereby to selectively degrade the effective magnetic latching force of said permanent magnet latching said magnetic array to said movable member, neutralize the effective magnetic latching force of said permanent magnet latching said magnetic array to said movable member, and overpower the magnetic latching force of said permanent magnet latching said magnetic array to said movable member by reversing the effective magnetic force of said magnetic array and repelling said magnetic array away from said movable member.

6. The mono-stable magnetic latch mechanism of claim 5 in which said modulatable range of operation further includes said first condition; the magnetic force of only said at least one permanent magnet normally holding said magnetic array in said stable latched condition; said control means characteristics further controlling the amount and polarity of energization of said at least one electromagnet to also selectively augment the magnetic force of said at least one permanent magnet and thereby to also selectively augment the magnetic force of said at least one permanent magnet latching said magnetic array to said movable member and increase the total effective magnetic latching force exerted by said magnetic array on said movable member.

7. A magnetic latch mechanism having only one stable latched condition and having an unstable unlatched condition, said mechanism comprising:

a first member, a fixed member having said first member operatively mounted thereon in limited movable relation relative to said fixed member, a magnetically-sensitive movable member movable relative to said first member and to said fixed member, and a magnetic array forming a part of said first member, said magnetic array having at least one permanent magnet and at least one electromagnet;

said one stable latched condition of said mechanism having said magnetic array magnetically latched to said movable member by the magnetic force caused by the magnetic flux of said at least one permanent magnet;

and said unstable unlatched condition of said mechanism having said at least one electromagnet electrically energized and producing sufficient magnetic flux strength opposing the magnetic flux of said at least one permanent magnet so that the magnetic flux of said at least one permanent magnet is at least neutralized and said magnetic array is released from magnetic latching engagement with said movable member.

8. The magnetic latch mechanism of claim 7 further comprising a control circuit having means controlling the presence or absence, and when present, the strength and direction of the effective magnetic flux of said magnetic array caused by said at least one electromagnet.

9. The magnetic latch mechanism of claim 7 in which said magnetic array comprises a single permanent magnet and a plurality of electromagnets defining a magnetic matrix having magnetic flux characteristics in accordance with the polar arrangement and interrelated physical positioning of said permanent magnet and said plurality of electromagnets.

10. The magnetic latch mechanism of claim 9 in which one of said plurality of electromagnets has windings wound about the body of said single permanent magnet.

11. The magnetic latch mechanism of claim 7 in which said magnetic array comprises at least one permanent magnet and a plurality of electromagnets defining a magnetic matrix having magnetic flux characteristics in accordance with the polar arrangement and interrelated physical positioning of said at least one permanent magnet and said electromagnets, at least one of said electromagnets having its windings wound about one of said at least one permanent magnets.

12. The magnetic latch mechanism of claim 11 in which said at least two of said plurality of electromagnets have armatures forming first and second pole pieces of said magnetic array with one of said at least one permanent magnets being a cross bar having opposed ends which are physically and magnetically attached to a generally center part of said first and second pole pieces at substantially 90° angles so that each of said pole pieces has an upper part extending above the juncture of each of said pole pieces with said one of said permanent magnet ends and a lower part extending below said juncture.

13. The magnetic latch mechanism of claim 12 in which at least two of said plurality of electromagnets have their windings about said upper parts of said first and second pole pieces.

14. The magnetic latch mechanism of claim 12 in which at least two of said plurality of electromagnets have their windings about said lower parts of said first and second pole pieces.

15. The magnetic latch mechanism of claim 13 in which another one of said plurality of electromagnets having its windings about said one of said at least one permanent magnets has its windings about said one of said at least one permanent magnets forming said cross bar.

16. The magnetic latch mechanism of claim 12 in which at least some of said plurality of electromagnets each have an armature defined by one of said pole piece upper parts and at least some others of said plurality of electromagnets each have an armature defined by one said pole piece lower parts.

17. The magnetic latch mechanism of claim 12 in which said upper and said lower parts of said pole pieces have the same magnetic lengths.

18. The magnetic latch mechanism of claim 12 in which said upper and said lower parts of said pole pieces have substantially different magnetic lengths.

19. The magnetic latch mechanism of claim 7 in which said magnetic array comprises at least one permanent magnet and a plurality of magnetically soft electromagnet armatures having electromagnet windings thereabout which are adapted to be electrically energized to induce temporary magnetic fluxes in said armatures having magnetic flux strength and polarity dependent upon the power of and the direction of the electrical energization in each of said electromagnet windings, said armatures being magnetically and physically interconnected with said at least one permanent magnet at the pole ends of said permanent magnets so as to be magnetically effective parts of said permanent magnets, said permanent magnets and said armatures being arranged to define a first magnetic flux matrix having predetermined magnetic flux characteristics in accordance with the polar arrangement and interrelated physical positioning of said permanent magnets, and when at least one of said electromagnet armatures are selectively magnetized at various selected magnetic flux strengths and polarities creating additional magnetic flux matrices having different predetermined magnetic flux characteristics in accordance with the polar arrangement and magnetic flux strengths of said at least one permanent magnet and said electromagnet armatures.

20. The magnetic latch mechanism of claim 19 in which said at least one permanent magnet is also an electromagnetic armature having other electromagnetic windings thereabout, said other electromagnetic windings also being selectively electrically energized and when so energized creating electromagnetic fluxes of variable magnetic flux strengths and polarities in said at least one permanent magnet modifying the effective magnetic flux of said at least one permanent magnet within a range where the magnetic strength of the effective magnetic flux of said at least one permanent magnet is reduced and neutralized.

21. The magnetic latch mechanism of claim 20 in which said range of modification of the effective magnetic flux of said at least one permanent magnet includes the overpowering of the permanent magnetic flux of said at least one permanent magnet and the effective polarity reversal of the effective magnetic flux of said at least one permanent magnet by the magnetic flux strength and polarity of said energized other electromagnetic windings.

22. The magnetic latch mechanism of claim 20 in which said range of modification of the effective magnetic flux of said at least one permanent magnet includes the enhancement of the permanent magnetic flux of said at least one permanent magnet, increasing the strength of said magnetic array magnetic latch to said movable member.

23. A brake and brake control system having a brake and an electrically deenergized and energized brake actuating and release mechanism for said brake, a brake control subsystem by which the electrical deeenergization and energization of said brake actuating and release mechanism is selectively and modulatingly controlled, said brake actuating and release mechanism including the magnetic latch mechanism of claim 7 in which said brake actuating and release mechanism magnetic latch mechanism is electrically deenergized to apply the brake and hold the brake in the brake applied mode, and is controllably electrically energized by said brake control subsystem to modulate a decreasing amount of brake application from the amount of brake application when said magnetic latch mechanism is electrically deenergized, and to release the brake and to maintain the brake in the released mode.

24. The system of claim 23 in which said brake control subsystem includes:

various means sensing the status of said brake, the demand for a change of brake status between brake applied and brake released mode and the amount of brake application when the brake is being applied at less that the maximum brake application available, and the deceleration effect of brake application on the vehicle in which said system is installed, an electronic information processing and brake control unit receiving signals from said sensing means, brake energization and deenergization drivers receiving information from said unit and generating electrical power signals selectively delivered to said brake actuating and release mechanism magnetic latch mechanism and actuating and releasing said brake in accordance with the amount of electrical power and the direction of the flow of the electrical power in said electromagnets which are energized by said power signals, said brake drivers selectively sending no electrical power to said brake actuating and release mechanism magnetic latch mechanism when full brake application is desired for full service braking as well as for the parking brake mode.

25. The system of claim 24, said subsystem further comprising at least one sensitivity control selectively modifying the brake application mode in accordance with the weight of the vehicle being braked.

26. The system of claim 24, said subsystem further comprising a master module adapted for installation in a vehicle trailer and a slave module adapted for installation in a tractor vehicle which may be used to tow said trailer, said brake being controlled being a trailer brake, said master module having therein said means sensing the status of said brake and the amount of brake application when the brake is being applied at less that the maximum brake application available, electronic information processing and brake control unit and said brake energization and deenergization drivers, and said slave module having therein said means sensing the demand for a change of brake status between brake applied and brake released mode and said means sensing the deceleration effect of brake application on the tractor vehicle in which said system slave module is installed being in said slave module.

27. The system of claim 26 in which said slave module further includes a parking brake apply control switch which when closed sends a signal to said electronic information processing and brake control unit, which upon receipt of such signal disables said brake control drivers and prevents any electrical energization of said magnetic array electromagnets, establishing the brake apply mode only utilizing the magnetic flux of said at least one permanent magnet in said magnetic array and latching said magnetic array to said movable member.

28. The system of claim 26 in which said slave module further includes a slave code unit having therein electronically readable serial number codes for the master modules of particular trailers that the tractor vehicle is authorized to move, and said master module further includes
a master code unit containing an electronically readable unique serial number code for that particular master module,
a code comparator which after said master and slave modules are connected as part of a tractor-trailer rig reads said master code unit serial number code and compares it to the serial number codes in said slave code unit, and only when finding a match of serial number codes generates a brake enable signal operatively sent to said brake control drivers enabling said drivers to send signals to said brake, and when finding no serial number code match operatively sends a brake disable signal to said brake control drives which renders said brake control drivers inoperative to send and electrical energizing signals to said brake so that said brake remains in the brake applied mode.

29. The system of claim 28 in which said slave module further includes a tractor vehicle ignition switch indicating that the vehicle ignition is turned on, a sensor sensing the start-up and running of the tractor vehicle engine, a sensor sensing the application of the tractor vehicle service brakes, and a fault lamp for indicating the occurrence of a fault in the system, said master module further including an initiate detector receiving signals that the vehicle ignition switch is turned on and that the tractor vehicle engine has started and is running, said initiate detector after receiving such signals then send a "run" signal to said code comparator which then compares the codes as aforesaid;

said master module also further including a current comparator receiving signals from said brake driver with current sensor reflecting the amount of electrical current being applied to each of the trailer vehicle brake circuits containing a brake controlled by said subsystem, said current comparator then sending signals to said electronic information processing and brake control unit which, when receiving current comparison signals indicating an imbalance over a predetermined allowable in said the brake circuit currents will energize said fault lamp in said slave module.

30. The method of selectively and alternatively magnetically latching and unlatching a first member to and from a second member, said method comprising the steps of:

(1) providing a magnetic-flux-conductive part of the second member;

(2) establishing a permanent magnetic flux within a part of the first member;

(3) magnetically latching the first member to the second member by only the permanent magnetic flux within a part of the first member;

(4) selectively establishing, modulating and disestablishing an electromagnetic magnetic flux within a part of the first member which when established is in magnetic flux interactive relation with the permanent magnetic flux, the electromagnetic flux when established being selectively of predetermined first or second magnetic polar orientations;

(5) the electromagnetic magnetic flux, when having the first magnetic polar orientation established, modifying the effect of the permanent magnetic flux so the net effective magnetic flux magnetically decreases the magnetic attraction of the first member to the second member;

(6) then further modifying the effect of the permanent magnetic flux by the electromagnetic flux so the net effective magnetic flux is such that the magnetic attraction of the first member to the second member is eliminated, causing the first member to be magnetically unlatched from the second member;

(7) then maintaining sufficient electromagnetic flux within the part of the first member to keep the first member unlatched from the second member;

(8) then modulating a decrease of the electromagnetic flux within the part of the first member so that the net effective magnetic flux permits and upon the magnetic and operable physical engagement of the first member with the magnetic-flux-conductive part of the second member further modulating the effective magnetic flux force of the part of the first member acting to keep that member part engaged with the second member, and controlling the desired extent of the magnetic latching attraction of the part of the first member to the second member;

(9) and when full force magnetic latching of the part of the first member to the second member is desired, disestablishing the electromagnetic flux and reestablishing the permanent magnetic flux as the only active magnetic flux, the permanent magnetic flux then having a full strength completed magnetic flux circuit through the magnetic-flux-conductive part of the second member and the part of the first member in which the permanent magnetic flux is established.

31. The method of claim 30 in which in step (6) when the effective magnetic flux causes magnetic latching release of the first member from the magnetic-flux-conductive part of the second member, further increasing the effective magnetic flux so that it creates a magnetic repelling force acting to urge the first member away from the second member.

* * * * *